US012626507B2

(12) United States Patent
Sanchez Lozano et al.

(10) Patent No.: US 12,626,507 B2
(45) Date of Patent: May 12, 2026

(54) METHOD AND APPARATUS FOR VIDEO ACTION CLASSIFICATION

(71) Applicant: SAMSUNG ELECTRONICS CO., LTD., Suwon-si (KR)

(72) Inventors: Enrique Sanchez Lozano, Staines (GB); Georgios Tzimiropoulos, Staines (GB); Yassine Ouali, Staines (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 312 days.

(21) Appl. No.: 18/208,144

(22) Filed: Jun. 9, 2023

(65) Prior Publication Data

US 2023/0316749 A1 Oct. 5, 2023

Related U.S. Application Data

(63) Continuation of application No. PCT/KR2023/002916, filed on Mar. 3, 2023.

(30) Foreign Application Priority Data

Feb. 21, 2023 (EP) ..................................... 23157744

(51) Int. Cl.
*G06V 20/00* (2022.01)
*G06V 10/82* (2022.01)
*G06V 20/40* (2022.01)

(52) U.S. Cl.
CPC .............. *G06V 20/41* (2022.01); *G06V 10/82* (2022.01)

(58) Field of Classification Search
CPC ......... G06V 20/41; G06V 10/82; G06V 40/20
See application file for complete search history.

(56) References Cited

U.S. PATENT DOCUMENTS

| | | | |
|---|---|---|---|
| 10,089,556 B1 | 10/2018 | Xu | |
| 12,198,397 B2 * | 1/2025 | Kadav | ..................... G06T 7/251 |
| 2019/0034734 A1 | 1/2019 | Yen et al. | |
| 2019/0102908 A1 | 4/2019 | Yang et al. | |
| 2021/0166009 A1 | 6/2021 | Sun et al. | |
| 2022/0019807 A1 * | 1/2022 | Carreira | ................. G06V 40/20 |

FOREIGN PATENT DOCUMENTS

| | | |
|---|---|---|
| CN | 112668366 A | 4/2021 |
| CN | 112969513 A | 6/2021 |
| KR | 10-1980551 B1 | 5/2019 |

(Continued)

OTHER PUBLICATIONS

Singh et al., "Online real-time multiple spatiotemporal action localisation and prediction," Proceedings of the IEEE International Conference on Computer Vision (Year: 2017).*

(Continued)

*Primary Examiner* — Xiao Liu
(74) *Attorney, Agent, or Firm* — Sughrue Mion, PLLC

(57) ABSTRACT

A method of controlling an apparatus for performing video action classification using a trained machine learning, ML, model, the method includes receiving a plurality of frames of a video, inputting, into the trained ML model, the plurality of frames, identifying an actor in the plurality of frames, wherein the actor performs an action in the plurality of frames, and based on the actor being identified, classifying the action performed by the actor.

14 Claims, 17 Drawing Sheets

(56) References Cited

FOREIGN PATENT DOCUMENTS

| | | |
|---|---|---|
| KR | 10-2020-0119386 A | 10/2020 |
| KR | 10-2176139 B1 | 11/2020 |
| WO | 2020/010040 A1 | 1/2020 |
| WO | 2021/189145 A1 | 9/2021 |

OTHER PUBLICATIONS

Gavrilyuk, Actor-Transformers for Group Activity Recognition, IEEE/CVF Conference on Computer Vision and Pattern Recognition (CVPR) (Year: 2020).*

European Examination Report issued Jan. 31, 2024 by the European Patent Office for EP Patent Application No. 23157744.6.

Communication dated May 19, 2023, issued by the European Patent Office in counterpart European Application No. 23157744.6.

Han et al., "A Survey on Visual Transformer," arXiv:2012.12556v6 [cs.CV], Jul. 2023, total 23 pages, XP081845202.

Ulutan et al., "Actor Conditioned Attention Maps for Video Action Detection," arXiv:1812.11631v3 [cs.CV], May 2020, total 10 page, XP033771258.

Girdhar et al., "Video Action Transformer Network," arXiv:1812. 02707v2 [cs.CV], May 2019, total 10 pages, XP033687530.

Communication dated Jun. 15, 2023, issued by the International Searching Authority in counterpart International Application No. PCT/KR2023/002916 (PCT/ISA/210).

Communication dated Jun. 15, 2023, issued by the International Searching Authority in counterpart International Application No. PCT/KR2023/002916 (PCT/ISA/237).

Shoufa Chen et al., "Watch Only Once: An End-to-End Video Action Detection Framework", Proceedings of the IEEE/CVF International Conference on Computer Vision (ICCV), 2021, pp. 8178-8187.

Pengwan Yang et al., "Few-Shot Transformation of Common Actions into Time and Space", Proceedings of the IEEE/CVF Conference on Computer Vision and Pattern Recognition (CVPR), 2021, pp. 16031-16040.

Effrosyni Mavroudi et al., "Actor-Centric Tubelets for Real-Time Activity Detection in Extended Videos", Proceedings of the IEEE/CVF Winter Conference on Applications of Computer Vision (WACV) Workshops, 2022, pp. 172-181.

Jiaojiao Zhao et al., "TubeR: Tubelet Transformer for Video Action Detection", Dec. 6, 2021, 10 pages, arXiv:2104.00969v3.

Nicolas Carion et al., "End-to-End Object Detection with Transformers", Proceedings of European Conference on Computer Vision (ECCV), 2020, pp. 213-229 (17 pages), Springer.

Christoph Feichtenhofer et al., "SlowFast Networks for Video Recognition", Proceedings of the IEEE/CVF International Conference on Computer Vision (ICCV), 2019, pp. 6202-6211.

PySlowFast: video understanding codebase from FAIR for reproducing state-of-the-art video models., Retrieved on Feb. 28, 2022, 4 pages, URL: https://github.com/facebookresearch/SlowFast/.

Chunhui Gu et al., "AVA: A Video Dataset of Spatio-temporally Localized Atomic Visual Actions", Proceedings of the IEEE Conference on Computer Vision and Pattern Recognition (CVPR), 2018, pp. 6047-6056.

Jiaojiao Zhao et al., "TubeR: Tubelet Transformer for Video Action Detection", Apr. 2, 2021, 10 pages, arXiv:2104.00969v1.

Haoqi Fan et al., "Multiscale Vision Transformers", Proceedings of the IEEE/CVF International Conference on Computer Vision (ICCV), 2021, pp. 6824-6835.

Yanghao Li et al., "MViTv2: Improved Multiscale Vision Transformers for Classification and Detection" Proceedings of the IEEE/CVF Conference on Computer Vision and Pattern Recognition (CVPR), 2022, pp. 4804-4814.

Ang Li et al., "The AVA-Kinetics Localized Human Actions Video Dataset", May 20, 2020, 8 Pages, arXiv:2005.00214v2.

Khurram Soomro et al., "UCF101: A Dataset of 101 Human Actions Classes From Videos in The Wild", Dec. 3, 2012, 7 pages, arXiv:1212. 0402v1.

Hueihan Jhuang et al., "Towards understanding action recognition", Proceedings of the IEEE International Conference on Computer Vision (ICCV), 2013, pp. 3192-3199 (8 pages).

Gurkirt Singh et al., "Online Real-time Multiple Spatiotemporal Action Localisation and Prediction", Proceedings of the IEEE International Conference on Computer Vision (ICCV), 2017, pp. 3637-3646.

Will Kay et al., "The Kinetics Human Action Video Dataset", May 19, 2017, 22 pages, arXiv: 1705.06950v1.

Depu Meng et al., "Conditional DETR for Fast Training Convergence", Proceedings of the IEEE/CVF International Conference on Computer Vision (ICCV), 2021, pp. 3651-3660.

Tsung-Yi Lin et al., "Microsoft COCO: Common Objects in Context", Proceedings of European Conference on Computer Vision (ECCV), 2014, Part V, LNCS 8693, pp. 740-755, Springer.

Adam Paszke et al., "PyTorch: An Imperative Style, High-Performance Deep Learning Library", Proceedings of the 33rd International Conference on Neural Information Processing Systems (NeurIPS 2019), 12 pages.

Ilya Loshchilov et al., "Decoupled Weight Decay Regularization", Conference Paper at the 7th International Conference on Learning Representations (ICLR 2019), Jan. 4, 2019, 19 pages, arXiv:1711. 05101v3.

Junting Pan et al., "Actor-Context-Actor Relation Network for Spatio-Temporal Action Localization", Proceedings of the IEEE/CVF Conference on Computer Vision and Pattern Recognition (CVPR), 2021, pp. 464-474.

João Carreira et al., "Quo Vadis, Action Recognition? A New Model and the Kinetics Dataset", Proceedings of the IEEE Conference on Computer Vision and Pattern Recognition (CVPR), 2017, pp. 6299-6308.

Shilong Liu et al., "DAB-DETR: Dynamic Anchor Boxes are Better Queries for DETR", Conference Paper at the 10th International Conference on Learning Representations (ICLR 2022), 20 pages, arXiv:2201.12329.

Zhuyu Yao et al., "Efficient DETR: Improving End-to-End Object Detector with Dense Prior", Apr. 3, 2021, 10 pages, arXiv:2104. 01318v1.

Xizhou Zhu et al., "Deformable DETR: Deformable Transformers for End-to-End Object Detection", Oct. 8, 2020, 12 pages, arXiv:2010. 04159v1.

* cited by examiner (a) Direct application of DETR (b) Actor-Action Transformer

FIG. 4A

| Backbone | GFLOPs | MParams | mAP |
|---|---|---|---|
| SlowFast-R50 32 x 2 | 173.9 | 69.5 | 26.8 |
| MVit-v1 16 x 4 | 137.3 | 67.5 | 27.1 |
| MVit-v2 16 x 4 | 129.3 | 65.5 | 30.4 |

(a) Backbone. All results are considering an input size of 256

FIG. 4B

| Mode | GFLOPs | mAP |
|---|---|---|
| Backbone | 129.3 | 30.4 |
| Frozen | 129.6 | 30.8 |
| Finetune | 258.9 | 31.5 |

(b) Memory

FIG. 4C

| Arch | GFLOPs | mAP |
|------|--------|------|
| 25/80 | 136.1 | 26.7 |
| 50/80 | 137.3 | 27.1 |
| 50/120 | 138.4 | 27.1 |

(c) Actor/Action Queries

FIG. 6

| Method | 1-Stage | mAP | GFLOPs |
|---|---|---|---|
| SlowFast, 8 x 8, R50 | X | 22.7 | 342.9* |
| WOO | V | 25.4 | 147.5 |
| ACAR 8 x 8, R50 | X | 27.7 | 345.5* |
| MViTv1-B, 64 x 3 | X | 27.3 | 700.7* |
| MViTv2-16, 16 x 4 | X | 27.0 | 303.4* |
| MeMViT-16, 16 x 4 | X | 29.3 | 304.7* |
| TubeR CSN-50 (IG + K400) | V | 29.3 | 78 |
| MeTViT-24, 32 x 3(312 ) | X | 35.4 | 866.0 |
| Ours (MViTv1-B, 16 x 4) | V | 27.1 | 137.3 |
| Ours (MViTv2-S, 16 x 4) | V | 30.4 | 129.3 |
| Ours (MViTv2-S, 16 x 4) (312 ) | V | 31.0 | 229.5 |
| Ours (Query Memory) | V | 31.5 | 258.9 |

FIG. 7

| Method | mAP |
|---|---|
| Zhang et al. 13D | 77.9 |
| S3D-G | 78.8 |
| AIA, R-50 | 78.8 |
| SF R-50, 8 x 4 | 82.4 |
| ACAR, SF R50 8 x 4 | 84.3 |
| YOWO (16-frame) | 80.4 |
| YOWO + LBF | 87.3 |
| Ours MViT-1 | 86.3 |
| Ours MViT-2 | 88.2 |

FIG. 8

| Method | mAP |
|---|---|
| AVA-baseline | 73.3 |
| ACT | 65.7 |
| ACRN | 77.9 |
| YOWO | 74.4 |
| YOWO + LFB | 75.7 |
| WOO(K600) | 80.5 |
| Context-Aware | 79.2 |
| Ours MViT-1 | 75.6 |
| Ours MViT-2 | 79.3 |

<u>General inference process</u>

FIG. 10

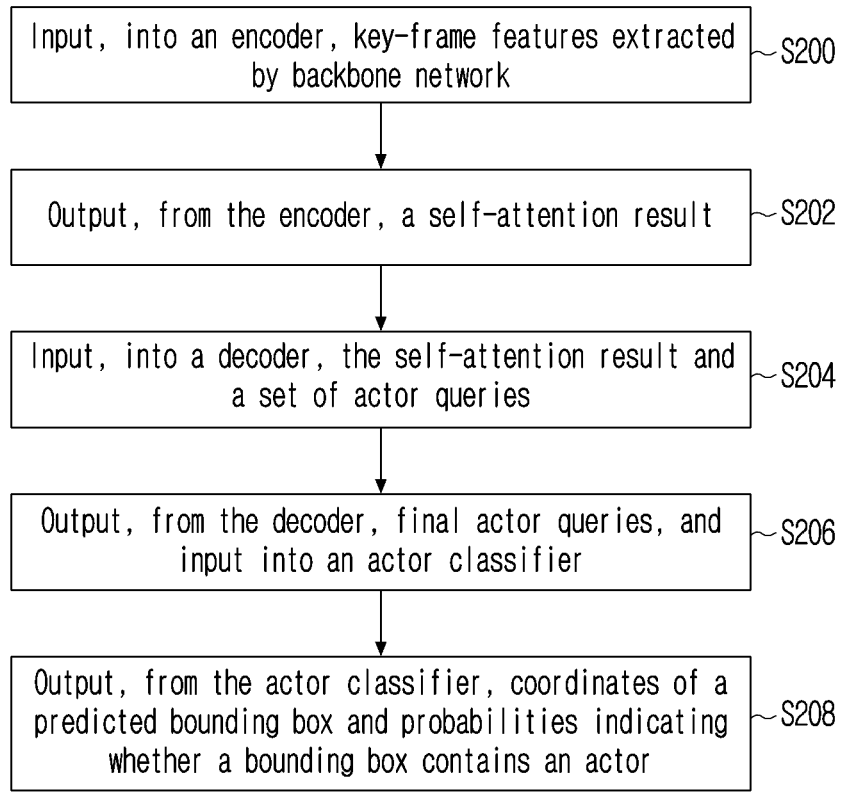

Process performed by actor transformer module

Input, into an encoder, key-frame features extracted by backbone network ~S200

Output, from the encoder, a self-attention result ~S202

Input, into a decoder, the self-attention result and a set of actor queries ~S204

Output, from the decoder, final actor queries, and input into an actor classifier ~S206

Output, from the actor classifier, coordinates of a predicted bounding box and probabilities indicating whether a bounding box contains an actor ~S208

FIG. 11

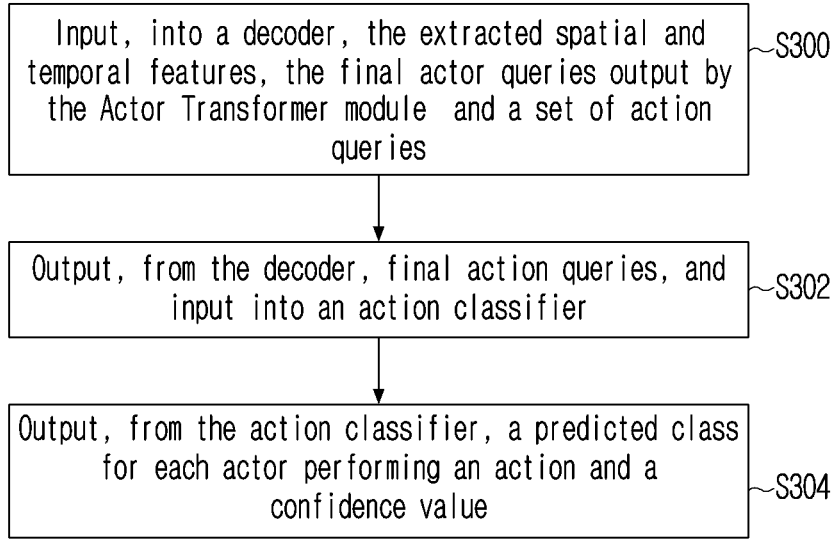

Process performed by action transformer module

| |
|---|
| Input, into a decoder, the extracted spatial and temporal features, the final actor queries output by the Actor Transformer module and a set of action queries |
~S300

| |
|---|
| Output, from the decoder, final action queries, and input into an action classifier |
~S302

| |
|---|
| Output, from the action classifier, a predicted class for each actor performing an action and a confidence value |
~S304

START

↓ receiving a plurality of frames of a video ~S1305

↓ inputting, into the trained ML model,
the plurality of frames ~S1310

↓ identifying an actor in the plurality of frames,
wherein the actor performs an action
in the plurality of frames ~S1315

↓ based on the actor being identified, classifying
the action performed by the actor ~S1320

↓

END

METHOD AND APPARATUS FOR VIDEO ACTION CLASSIFICATION

CROSS-REFERENCE TO RELATED APPLICATIONS

This application is a continuation application of International Application No. PCT/KR2023/002916 filed on Mar. 3, 2023, which is based on and claims priority to Greek Patent Application No. 20220100210 filed on Mar. 4, 2022 and European Patent Application No. 23157744.6 filed on Feb. 21, 2023, the disclosures of which are incorporated by reference herein in their entireties.

TECHNICAL FIELD

The present application generally relates to a method and apparatus for action recognition or classification in videos. In particular, the present application relates to a computer-implemented method for performing video action classification using a trained machine learning, ML, model.

BACKGROUND ART

Object detection models predict a set of bounding boxes around objects of interest in an image, and category or class labels for such objects. For example, the models may identify a dog in an image, predict a bounding box around the dog, and classify the object in the bounding box as a "dog". Videos may depict actors who are undertaking or performing actions. The term "actor" is used generally herein to mean a human, animal or object that may be performing an action. It is desirable in many contexts to recognise actions within videos. Thus, object detection models may be used to identify actors within videos, as well as the actions being performed by those actors.

Spatio-temporal action localisation is the problem of localising actors in space and time and recognising their actions. Compared to action recognition, the task of spatio-temporal action location is more challenging, as it requires spatio-temporal reasoning by taking into account multiple factors including the motion of multiple actors, their interactions with other actors, and their interactions with the surroundings.

State-of-the-art methods for solving this problem mainly rely on a complicated two-stage pipeline where a first network for a person detector is used to detect actors (e.g. people) in key frames, and then a second network is used for spatio-temporal action classification. This pipeline has at least two disadvantages: (a) the two stages are disjoint and so are not able to benefit from each other, and (b) it introduces significant computational overheads as the two networks must be employed one after the other.

Therefore, the present applicant has recognised the need for an improved technique for performing video action classification.

DISCLOSURE

Technical Solution

According to an embodiment, a method of controlling an electronic apparatus for performing video action classification using a trained machine learning, ML, model, the method includes receiving a plurality of frames of a video, inputting, into the trained ML model, the plurality of frames, identifying an actor in the plurality of frames, wherein the actor performs an action in the plurality of frames, and based on the actor being identified, classifying the action performed by the actor.

The method may further include extracting spatial features and temporal features from the plurality of frames by using a backbone network in the trained ML model.

The identifying the actor within the plurality of frames may include applying an actor transformer module in the trained ML model to the extracted spatial features and temporal features from key frames of the plurality of frames, and predicting a bounding box around the actor performing the action.

The applying the actor transformer module to the extracted spatial features and temporal features may include inputting, into an encoder in the actor transformer module, the extracted spatial features and temporal features from the key frames, outputting, from the encoder in the actor transformer module, position features indicating potential positions of the actor in the key-frames, inputting, into a decoder in the actor transformer module, the position features output from the encoder in the actor transformer module, and a set of actor queries, and outputting, from the decoder in the actor transformer module, final actor queries. The predicting the bounding box around the actor performing the action may include inputting, into an actor classifier in the actor transformer module, the final actor queries, and outputting, from the actor classifier, coordinates of the bounding box for the actor and a classification score indicating a likelihood of the bounding box containing the actor.

The classifying the action performed by the actor may include applying an action transformer module in the trained ML model to the extracted spatial features and temporal features, and predicting a class for the actor performing the action.

The applying the action transformer module to the extracted spatial features and temporal features may include inputting, into an encoder in the action transformer module, the extracted spatial features and temporal features, outputting, from the encoder in the action transformer module, action features indicating potential actions of the actor, inputting, into a decoder in the action transformer module, the action features output from the encoder in the action transformer module, the final actor queries output by the decoder in the actor transformer module, and a set of action queries, and outputting, from the decoder in the action transformer module, final action queries. The predicting the class for the actor performing the action may include inputting, into an action classifier in the action transformer module, the final action queries, and outputting, from the action classifier, the class for the actor performing the action and a confidence value corresponding to the class.

The method may further include matching the predicted bounding box with the predicted class for the actor, and obtaining a matching score indicating a likelihood of the predicted bounding box being associated with the predicted class.

The matching may include matching the predicted bounding box with the predicted class for the actor having the confidence value greater than a predetermined threshold value.

The matching may include matching the predicted bounding box with two or more predicted classes.

The method may further include compressing, using the matching score, the plurality of frames of the video.

The plurality of frames may be a first set of frames in the video. The method may further include classifying an action performed by the actor in a second set of frames in the video.

The first set of frames may be a subsequent set of the second set of frames.

The video action classification may be performed in real-time or near real-time.

The identified actor may be a human object or animal object.

According to an embodiment, an electronic apparatus for performing video action classification using a trained machine learning, ML, model includes a communication interface, at least one processor configured to receive, through the communication interface, a plurality of frames of a video, input, into the trained ML model, the plurality of frames, identify an actor in the plurality of frames, wherein the actor performs an action in the plurality of frames, and based on the actor being identified, classify the action performed by the actor.

DESCRIPTION OF DRAWINGS

Implementations of the present techniques will now be described, by way of example only, with reference to the accompanying drawings, in which:

FIGS. 4A to 4C show results of ablation experiments;

FIGS. 6, 7 and 8 show results of experiments that compare the present techniques with existing techniques;

FIG. 10 is a flowchart of example steps performed by the actor transformer module to identify actors within the plurality of input frames;

FIG. 11 is a flowchart of example steps performed by the action transformer module to classify the actions performed by actors identified by the actor transformer module.

MODE FOR INVENTION

Figure 1:
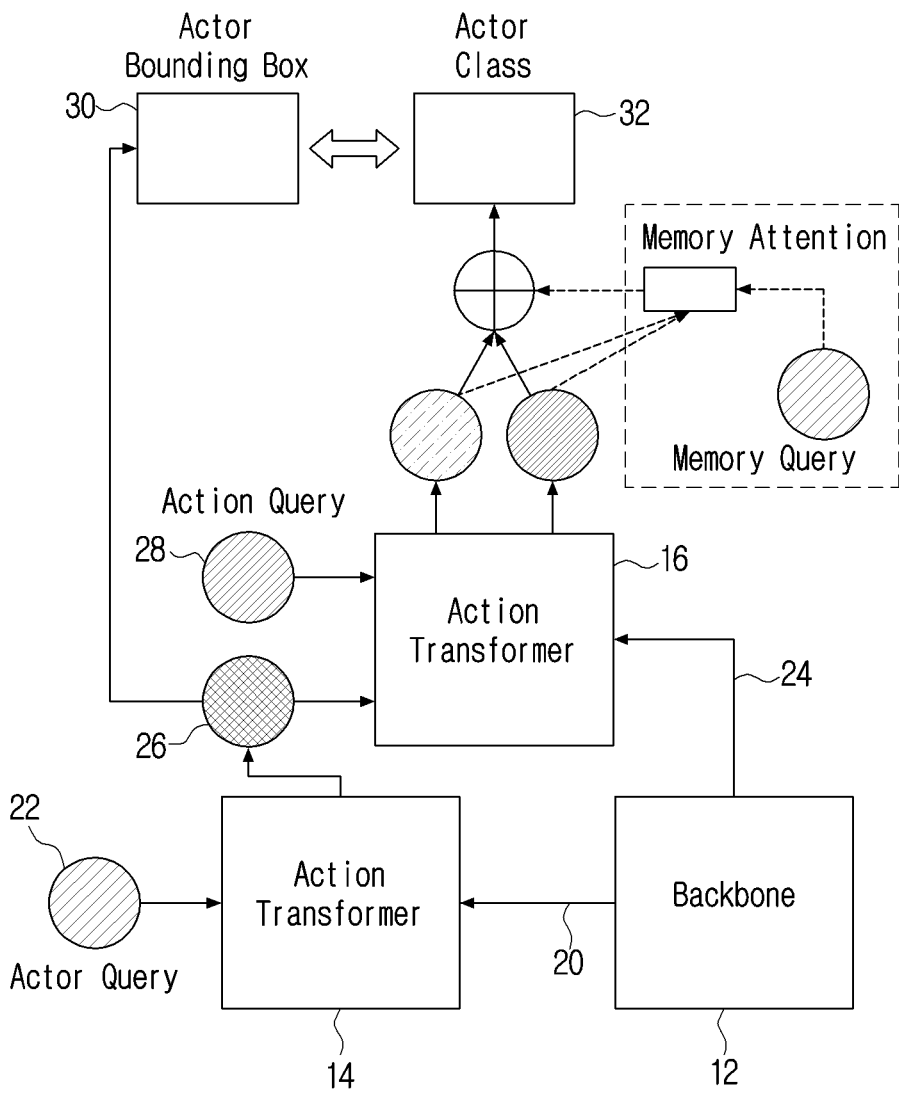
FIG. 1 shows a block diagram of an Actor-Action Transformer of the present techniques for video action classification.

In a first approach of the present techniques, there is provided a computer-implemented method to perform video action classification using a trained machine learning, ML, model, the method comprising: receiving a plurality of frames of a video; inputting the plurality of frames into the ML model and using the trained model to: identify, within the plurality of frames, whether there any actors performing an action in the frames; identifying and classifying, when at least one actor is identified, the actions being performed in the frames; and matching the identified actors to the identified and classified actions.

Advantageously, the present techniques provide a more computationally-efficient way to perform video action classification relative to existing methods. This is because, as mentioned above, existing methods first identify every person within a video or frames of a video, and then classify each identified person. This is time-consuming, and therefore computationally inefficient, if the goal is to identify each person who is doing a specific action. Furthermore, existing methods typically involve a two-stage approach to action classification—in a first stage, a first network is used to detect people, and in a second stage, a second network is used to classify every detected person. The two networks must be employed one after the other, which is not only time-consuming but also requires significant computing power, which can make existing methods unsuitable for use in real-time or near real-time (e.g. in autonomous vehicles or robotic devices) and/or in resource-constrained devices.

In contrast to existing techniques, the present techniques only identify actors in the frames of a video that are performing a specific (target) action, which avoids needing to classify every single actor, and is thereby more efficient. In the present techniques, first these actors are identified, and in parallel, all actions being performed in the frames of the video are identified and classified. Then, the actors and actions are matched up to classify the actions within the video. In other words, the present techniques provide a single stage method for spatio-temporal action localization in videos, where the actors are detected first, then the actions are detected thereafter, and then the actors and actions are seamlessly matched together. This means that, prior to the matching step, the ML model has produced an abstract representation of what occurs in a video, but this representation does not say which actor does what action.

The method may further comprise: using a backbone network of the ML model to extract spatial features and temporal features from the plurality of frames. The backbone network may be any suitable network to process frames of a video and output spatio-temporal information. In one example, the backbone network may be a convolutional neural network, CNN. It will be understood that a CNN is a non-limiting example, and any suitable backbone network that is able to output spatio-temporal information from frames of a video may be used.

Once the backbone network of the ML model has outputted spatio-temporal information, the method may further comprise: applying an actor transformer module of the ML model to the extracted spatial features and temporal features from key frames of the plurality of frames, and predicting a bounding box around each actor performing an action. The actor transformer module is used to identify whether there are any actors within the plurality of frames. The actor transformer module may preferably identify or detect each actor within the plurality of frames that is performing a specific action, and not simply every actor. The specific action may be pre-determined, and there may be a plurality of specific actions of interest. For example, there may be 80 action types which are of interest, and only the actors performing any one or more of these action types may be identified by the actor transformer module. It will be understood that the actor transformer module is a transformer-based model or network, which is particularly suitable for computer vision tasks.

Applying an actor transformer module to the extracted spatial features and temporal features may comprise: inputting the extracted spatial features and temporal features from the key frames into an encoder of the actor transformer module; outputting, from the encoder, a self-attention result for the extracted spatial features and temporal features; inputting, into a decoder of the actor transformer module, the self-attention result output from the encoder of the actor transformer module, and a set of actor queries; outputting, from the decoder, final actor queries; inputting the final actor queries into an actor classifier; and outputting, from the actor classifier, coordinates of a predicted bounding box around each actor and a corresponding classification score indicating a likelihood of the predicted bounding box containing an actor.

In parallel with identifying and classifying the actors performing a specific action, the method comprises classifying the action performed by each actor. This classification process may comprise: applying an action transformer module of the ML model to the extracted spatial features, and predicting a class for each actor performing an action.

Applying an action transformer module to the extracted spatial features may comprise: inputting, into a decoder of the action transformer module, the extracted spatial and temporal features, the final actor queries output by the decoder of the actor transformer module, and a set of action queries; outputting, from the decoder of the action transformer module, final action queries; inputting the final action queries into an action classifier; and outputting, from the action classifier, a predicted class for each actor performing an action and a corresponding confidence value. In the action transformer, an encoder is not required in cases where the backbone network is based on self-attention.

As noted above, once the actor transformer module and the action transformer module have output their predictions, it is necessary to match the predictions together. The step of matching the identified actors to the identified and classified actions may comprise consolidating or combining the outputted predictions to provide predictions of each bounding box containing an actor performing a specific action. That is, the method may comprise matching the predicted bounding boxes with the predicted class for each actor, by: generating a set of actor-action queries; inputting the set of actor-action queries into a classifier for producing conditional class predictions; and outputting, from the classifier, a confidence of a specific bounding box around an actor being associated with a predicted class for that actor.

The matching may comprise: matching the predicted bounding boxes with predicted classes for each actor having a corresponding confidence value greater than a predetermined threshold value. That is, some of the predictions made by the actor transformer module and/or action transformer module may be ignored or discarded to concentrate on those predictions that are associated with a high confidence value. This further reduces the computational complexity of the method.

The matching may comprise: matching each predicted bounding box with two or more predicted classes. That is, an actor may be classified as performing multiple actions, such as 'sitting down' and 'talking to another person'.

The method may further comprise: compressing, using the likelihood of a specific bounding box around an actor being associated with a predicted class for that actor, the plurality of frames of a video.

The method may further comprise: using the video action classification performed for a first set of frames of a video to classify a second set of frames of the video. That is, the computational complexity may be further reduced by using the results of classifying one set of frames to aid the classification of a subsequent set of frames in a video. This may be possible because typically, there will be some overlap in what sequential frames of a video show/capture. Each set of frames, also referred to herein as a 'video clip' or a 'clip' may comprise a predefined number of frames. For example, the set of frames may comprise 64 sequential frames, which may equate to two seconds of video time. The next set of frames may be the next 64 frames in the video. Alternatively, to further reduce the computational complexity, the set of frames may comprise every other frame in a two-second window, i.e. 32 frames.

The video action classification method may be performed in real-time or near real-time. As noted above, this is advantageous because it enables the video action classification method to be used in environments or in devices where real-time or near real-time analysis may be crucial for safety reasons. For example, the present techniques may be used in robotics devices and/or autonomous vehicles.

The identified actor may be a human, an animal, or a machine (e.g. a robotic device).

In a second approach of the present techniques there is provided an apparatus for performing video action classification using a trained machine learning, ML, model, the apparatus comprising: an interface for receiving a plurality of frames of a video; and at least one processor coupled to memory, for inputting the plurality of frames into the ML model and using the trained model to: identify, within the plurality of frames, whether there any actors performing an action in the frames; identify and classify, when at least one actor is identified, the actions being performed in the frames; and match the identified actors to the identified and classified actions.

The features described above with respect to the first approach apply equally to the second approach, and for the sake of conciseness are not repeated.

The apparatus may be: a smartphone, tablet, laptop, computer or computing device, virtual assistant device, a vehicle, a drone, an autonomous vehicle, a robot or robotic device, a robotic assistant, image capture system or device, an augmented reality system or device, a virtual reality system or device, a gaming system, an Internet of Things device, a smart consumer device, and a wearable device. It will be understood that this is a non-exhaustive and non-limiting list of example apparatus.

In a related approach of the present techniques, there is provided a computer-readable storage medium comprising instructions which, when executed by a processor, causes the processor to carry out the methods described herein.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the present techniques also provide a non-transitory data carrier carrying code which, when implemented on a processor, causes the processor to carry out any of the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments of the techniques described herein may comprise source, object or executable code in a conventional programming language (interpreted or compiled) such as Python, C, or assembly code, code for setting up or controlling an ASIC (Application Specific Integrated Circuit) or FPGA (Field Programmable Gate Array), or code for a hardware description language such as Verilog® or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

It will also be clear to one of skill in the art that all or part of a logical method according to embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

The methods described above may be wholly or partly performed on an apparatus, i.e. an electronic device, using a machine learning or artificial intelligence model. The model may be processed by an artificial intelligence-dedicated processor designed in a hardware structure specified for artificial intelligence model processing. The artificial intelligence model may be obtained by training. Here, "obtained by training" means that a predefined operation rule or artificial intelligence model configured to perform a desired feature (or purpose) is obtained by training a basic artificial intelligence model with multiple pieces of training data by a training algorithm. The artificial intelligence model may include a plurality of neural network layers. Each of the plurality of neural network layers includes a plurality of weight values and performs neural network computation by computation between a result of computation by a previous layer and the plurality of weight values.

As mentioned above, the present techniques may be implemented using an AI model. A function associated with AI may be performed through the non-volatile memory, the volatile memory, and the processor. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning. Here, being provided through learning means that, by applying a learning algorithm to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Broadly speaking, the present techniques generally relate to a method and apparatus for action recognition or classification in videos. In particular, the present techniques provide a computer-implemented method for performing video action classification using a trained machine learning, ML, model.

To alleviate the above-mentioned concerns with existing techniques, the present Applicant advocates for a single-stage framework for end-to-end spatio-temporal action localization based on the DEtection TRansformer (DETR) framework. A key problem with DETR-based approaches is optimization difficulties which, unfortunately, are further exacerbated by the complexity of the spatio-temporal action localization task. To this end, the present techniques make three key contributions. Firstly, a new transformer-based architecture is proposed for spatio-temporal action localization, called Actor-Action Transformer, which is amenable to seamless optimization and results in highly-efficient localization and recognition accuracy. The main idea behind the Actor-Action Transformer is to disentangle the two tasks by firstly detecting the actors using an Actor Transformer and then performing spatio-temporal action classification conditioned on the actor queries using an Action Transformer. Secondly, to train the Actor-Action transformer, an appropriate actor-action matching process for learning to associate actors with actions is proposed. Thirdly, to model long-range interactions, an action query memory that leverages the set prediction nature of the method for an efficient memory construction is proposed. It is shown below that the Actor-Action Transformer largely outperforms previous methods on the most established benchmarks for spatio-temporal action localization benchmarks, including AVA, delivering the best accuracy vs efficiency trade-off.

As mentioned above, the present techniques provide a solution to the challenging task of spatio-temporal action localization, which encompasses both localizing people/actors in videos and classifying their corresponding actions. Compared to action recognition, this task requires to perform spatio-temporal reasoning by taking into account multiple factors including the motion of multiple actors as well as their interactions with other actors and their surroundings. The present techniques are tested on the challenging AVA benchmark where the mean average precision (mAP) achieved by existing methods is still fairly low (~30%).

There are mainly two types of approach for spatiotemporal action localization. The majority of works are two-stage approaches that firstly detect the actors using a person detector over the key frames (i.e. the central frame), and then perform action classification over the whole video clip. Despite being very popular, such approaches are complicated and computationally inefficient for real-world deployment, as two separate networks must be applied one after the other.

Some single-stage methods do exist, which combine both detection and classification into a unified framework. Following this trend, and inspired by recent advances in object detection transformers, that is DETR and its variants, the present techniques propose a general and flexible transformer-based architecture for single-stage spatiotemporal action localization that can be trained in an end-to-end manner.

TubeR uses the DETR framework for spatio-temporal action localization, but TubeR's architecture faithfully follows DETR's and as the experiments presented herein show, a direct application of DETR to spatio-temporal action localization is difficult to train. This is owning to the fact that a key problem with DETR-based approaches is optimization difficulties, which are further exacerbated by the complexity of the spatio-temporal action localization task.

To alleviate this, the present Applicant has decomposed the problem into two sub-problems: actor detection performed by an Actor Transformer, and spatio-temporal action classification conditioned on the actor queries performed by an Action Transformer, both trained jointly in an end-to-end manner. FIG. 1 shows a block diagram of an Actor-Action Transformer of the present techniques for video action classification. The Actor-Action Transformer model comprises a video backbone model 12, which may be any suitable model or neural network for extracting features from a video clip (i.e. a plurality of frames of a video). In some cases, the video backbone model 12 may be a convolutional neural network, CNN. The video backbone model 12 extracts spatio-temporal features from a plurality of frames of a video.

The Actor-Action Transformer model comprises an actor transformer module 14 and an action transformer module 16. The actor transformer module 14 operates over features extracted from the key-frames of the plurality of frames of the video (i.e. not features extracted from all of the frames). The inputs into the actor transformer module 14 comprise the extracted spatio-temporal features 20 and a set of learnable queries 22 relating to actors. The queries 22 enable the actor transformer module to identify whether there are any actors present within the frames of the video. The actor transformer module 14 transforms the learnable queries into actor-specific queries 26 that encode the position and appearance of potential actors within the key-frames, assigning a single query to a unique actor in the scene. The actor-specific queries 26 are then used by the actor transformer module 14 to place a bounding box 30 around each possible actor within the frames of the video, and a classification score or probability indicating whether or not the bounding box contains an actor.

The action transformer module 16 operates over the whole volume of spatio-temporal features (i.e. from all of the frames, not just key frames) and encodes action relevant spatio-temporal information by transforming a new set of learnable queries into action-specific queries, also conditioning on the actor queries of the Actor Transformer. That is, the inputs into the action transformer module 16 comprise the extracted spatio-temporal features 24 and a set of learnable queries 28 relating to actions. The queries 28 enable the action transformer module 16 to identify whether there are any actors performing specific actions within the frames of the video. The inputs into the action transformer module 16 also comprise the actor-specific queries 26 that encode the position and appearance of potential actors within the key-frames (which has been output by the actor transformer module 14). The action transformer module 16 outputs a class 32 for each actor performing an action, and a corresponding confidence value or probability that they are performing that action. For example, the class may be "jumping", and the confidence value indicates how sure the action transformer module 16 is that the actor (human or animal) is jumping.

The action queries 28 may be readily used to construct a compressive memory, tailored to the present framework, for modelling long-range dependencies and interactions to further improve action classification. This is described in more detail below.

In summary, the present Applicant provides the following contributions:

A new architecture for spatio-temporal action localization, called the Actor-Action Transformer, which is amenable to seamless optimization and results in highly-efficient localization and recognition accuracy. The Actor-Action Transformer disentangles the two tasks by firstly detecting the actors using an Actor Transformer and then performing action classification conditioned on the actor queries using an Action Transformer.

A training method for the Actor-Action transformer, involving an appropriate actor-action matching process for learning to associate actors with actions.

Modelling long-range interactions using an action query memory that leverages the set prediction nature of the method for efficient memory construction.

Demonstration that the Actor-Action Transformer has favourable properties in terms of accuracy, computational efficiency and run-time performance compared to well-established two-stage methods on the most standard benchmarks.

Related Work. Some existing video action classification techniques are now described.

Two-stage spatio-temporal action localization: With the introduction of the challenging AVA dataset, a multitude of methods have been proposed following a two-stage approach to solve this problem. In general, they consist of using a strong off-the-shelf object detector for actor detection in the first stage, followed by a second action classification stage. These methods can achieve high action recognition accuracy, but the adoption of a two-stage approach makes them complicated and inefficient for real-world deployment.

Single-stage spatio-temporal action localization: Closely related to the proposed Actor-Action Transformer are a number or works which conduct both detection and classification in a unified framework. Action TX integrates a region proposal network (RPN) into an I3D network to localize the actors, followed by a stack of transformer layers for action classification. While being single stage, Action TX operates over multiple proposals of a single actor in the scene, resulting in a larger number of actor representations and eliminating the possibility of modelling unique actor interactions. Additionally, the actor representations are obtained by duplicating the 2D proposals over time, resulting in sub-optimal representations. WOO uses a Sparse R-CNN to detect the actors which results in unique per-actor representations. However, and similar to Action TX, the temporal dimension is collapsed to obtain such representations, and the action classification is then based on these representations and the spatially collapsed representation, greatly reducing the model's spatio-temporal capabilities. SE-STAD follows WOO, and uses a similar architecture, but with an additional semi-supervised loss to train on unlabelled frames.

The most closely-related method to the present techniques is TubeR which also proposes a DETR-based framework for spatio-temporal action localization. Spatio-temporal features produced by a video backbone are processed by a stack of encoder layers, which are then used to update a set of tublet queries using decoder layers, where each tublet query consists of a set of per input-frame queries. Finally, these queries are used to regress the bounding box and predict the action at each timestep. Contrary to the present techniques, TubeR uses a single transformer encoder-decoder to detect both actors and actions simultaneously and hence can be considered as a direct application of DETR to spatio-temporal action localization. The present Applicant found that such an architecture is hard to train. In contrast, in the proposed Actor-Action Transformer, the two tasks are disentangled with the main dependency being that the Action Transformer is conditioned on the actor queries produced the Actor Transformer. Notably, it was found that the architecture of the present techniques is significantly more amenable to seamless optimization.

Memory-augmented spatio-temporal action localization: In order to consider long temporal context necessary to detect long and complex actions (e.g. >few seconds), long term video understanding approaches focus on either designing efficient models to process longer time spans, or on equipping the model with some form of temporal memory. A standard way to construct and use the memory consists of using pre-computed features extracted over a large temporal span which are then injected into the detection module through attention. Recently, end-to-end methods for long term video understanding have been proposed, which involve designing a video backbone capable of processing both current short-term and cached long-term features.

It is shown herein that the design of the present Actor-Action Transformer naturally enables the construction of an action query memory that leverages the set prediction nature of the present method and can be seamlessly used to model long-range interactions.

DETR-based approaches: Given the complexity of popular object detectors, requiring many hand-designed components like non-maximum suppression or proposal generation, the authors of DETR proposed a transformer architecture for object detection which reformulates the detection task as a set prediction problem, uniquely assigning a prediction to a ground truth object. Moreover, because DETR was observed to have a slow-converging training (up to 500 epochs), many follow-up works attempted to improve its optimization using various approaches, such as sparse attention, an encoder-only architecture, or by refining the reference coordinates in the decoder layers.

It is also confirmed herein that the previous findings related to DETR's optimization difficulties showing that a direct application of DETR to spatio-temporal action localization is hard to train. To this end, the present Actor-Action Transformer enables seamless optimization and results in highly-efficient localization and recognition accuracy.

Video Transformers: Recently, a number of video transformers have been proposed, mainly focusing on reducing the memory and computational cost of the full space-time attention. For comparison purposes with previous works, the experiments used MViT and MViT-v2 as backbones for the proposed Actor-Action Transformer.

DETR: DETR formulates the object detection as a set prediction problem, making unique per-ground truth object predictions based on a set of N learnable queries and the input image features. More concretely, given an input image x, a backbone first generates a set of features $h \in \mathbb{R}^{C \times H \times W}$, which are then projected into lower dimensional features $z \in \mathbb{R}^{d \times H \times W}$. DETR consists of a stack of encoder-decoder layers with standard transformer blocks. The encoder consists of a series of Le transformer encoder layers with self-attention to transform the input features z for better context representation. Each encoder layer consists of a Layer Norm, a multi-head self-attention layer, a residual connections, and a feed-forward network (FFN). The features $z^{(l)}$ at layer l are transformed as:

$$\hat{z}^{(l)} = MHSA(LN(z^{(l)})) + z^{(l)}$$

$$z^{(l+1)} = FFN(LN(\hat{z}^{(l)})) + \hat{z}^{(l)} \tag{1}$$

The decoder consists of $L_d$ decoder layers and is parsed with a set of N learnable embeddings $o \in \mathbb{R}^{N \times d}$, known as object queries, which are transformed into the output embeddings that will be assigned a bounding box and an object class. (In practice, the input queries to the transformer decoder are set to zeros, and the object queries are added as positional encodings to the keys and values. The output queries are then passed to the next layers, with the keys and values again amended with the learnable encodings known as object queries. For the sake of simplicity and clarity, the learnable object queries are referred to herein as the input to the decoder). Each decoder layer consists of a multi-head self-attention module (MHSA), applied on the object queries o to model the interaction between objects and to remove duplicates, and a multi-head cross attention layer (MHCA) to refine the detections based on the image content $z^{(L_e)}$. For each layer l, the object queries o are transformed as:

$$\hat{o}^{(l)} = MHSA(LN(o^{(l)}) + o^{(l)};$$

$$\hat{o}^{(l)} = MHCA(LN(\hat{o}^{(l)}), z^{(L_e)}) + \hat{o}^{(l)};$$

$$o^{(l)} = FFN(LN(\tilde{o}^{(l)}) + \tilde{o}^{(l)} \tag{2}$$

The updated object queries $o^{(L_d)}$ are then forwarded to a box regression head and a classification head, resulting in a set of N predictions $$\hat{y} = \{\hat{y}_i\}_{i=1}^{N}$$

containing the normalized box coordinates $\hat{b}_i \in [0,1]^{4^{\wedge}}$ and the class probabilities $\hat{p}_i(c_i)$ of ground-truth class $c_i$. To train the network, a bipartite matching step is first applied to find a permutation $\sigma$ that matches the predictions $$\{\hat{y}_i\}_{i=1}^{N}$$

to the ground-truth set $$\{y_i\}_{i=1}^{N},$$

which is filled with the no-object class $\varnothing$. The matching cost takes into account both the class predictions and ground truth boxes. The permuted predictions $$\hat{y}_\sigma = \{\hat{y}_{\sigma(i)}\}_{i=1}^{N}$$

are used to compute the training loss, consisting of a cross-entropy $\mathcal{L}_{CE}$ for classification, and a regression loss for detection (i.e. an L1 and a GIoU loss):

$$\mathcal{L}_{DETR}(y, \hat{y}_{\sigma(i)}) = \quad (3)$$
$$\sum_{i}^{N} \lambda_1 \mathcal{L}_{CE}(y_i, \hat{p}_{\sigma(i)}(c_i)) + \lambda_2 \mathcal{L}_1(b_i, \hat{b}_{\sigma(i)}) + \lambda_3 \mathcal{L}_{iou}(b_i, \hat{b}_{\sigma(i)})$$

with $\lambda_i \in \mathbb{R}$ the loss weighting hyperparameters.

Figure 2A:
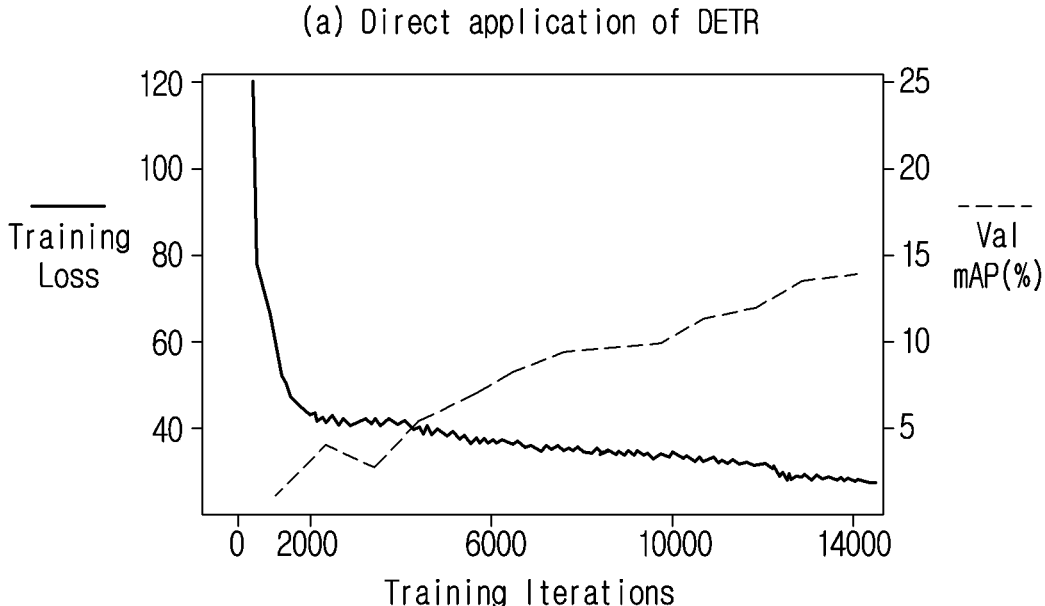
FIGS. 2A and 2B show experimental results comparing the training convergence and validation of the present techniques with an existing technique.
Figure 2B:
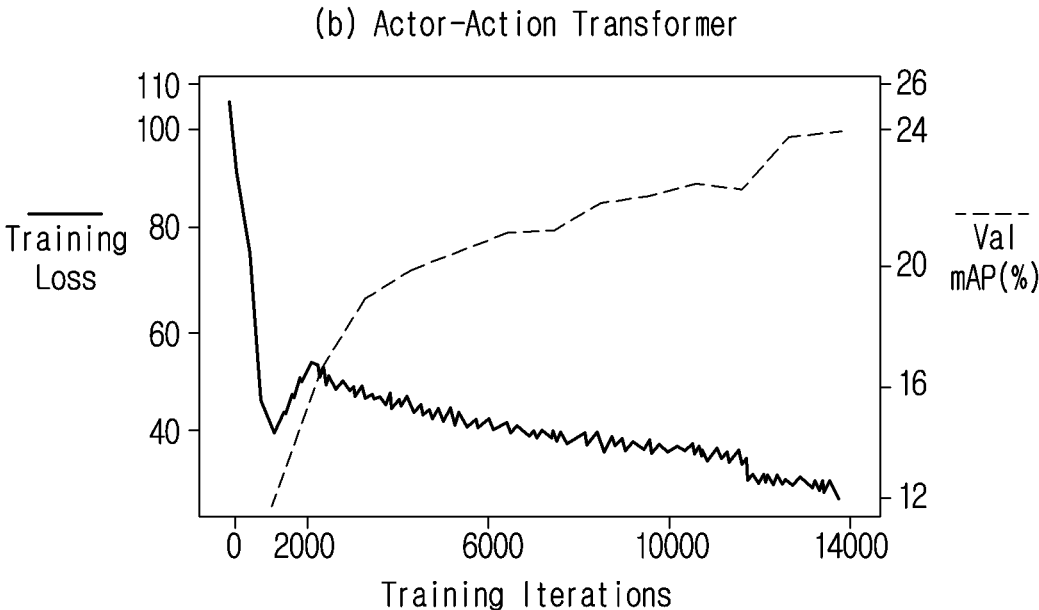

Method. The objective of the present techniques is to design a single-stage end-to-end framework, taking as input a given video clip, and directly detecting the actors in the form of bounding boxes with respect to the key-frame, in addition to classifying the action being performed by each one. A straight-forward adaptation of DETR for spatio-temporal action localization consists of simply replacing the spatial attention with a spatio-temporal variant, and then directly using the output queries to regress the boxes and predict the actions. However, such a design results in a difficult learning task, entangling actor detection, that requires to localize the actors spatially, and action classification, which is more challenging requiring long-term spatio-temporal reasoning (e.g. taking into consideration the actors' motions and the different interactions and relations between the actors and their surroundings). FIGS. 2A and 2B show training convergence and validation of mean average precision (%) of, respectively, a proof-of-concept model that consists of a direct application of DETR to spatio-temporal inputs, and the proposed Actor-Action Transformer. The results correspond to the AVA 2.2 dataset and are obtained using a Slow-50-8×8 backbone. As illustrated in FIGS. 2A and 2B, initial experiments have shown that such a design suffers from a slow convergence compared to the proposed Actor-Action Transformer.

A note on notation: Herein, the broadcast sum operator $\oplus$ is defined as a function that takes two matrices $a \in \mathbb{R}^{a \times d}$ and $b \in \mathbb{R}^{b \times d}$, and produces a tensor $ab \in \mathbb{R}^{a \times b \times d}$, where each entry $ab_{[a,b,:]} \in \mathbb{R}^d$, results from the element-wise summation over C of row $a_a \in \mathbb{R}^d$ and row $b_b \in \mathbb{R}^d$.

Figure 3:
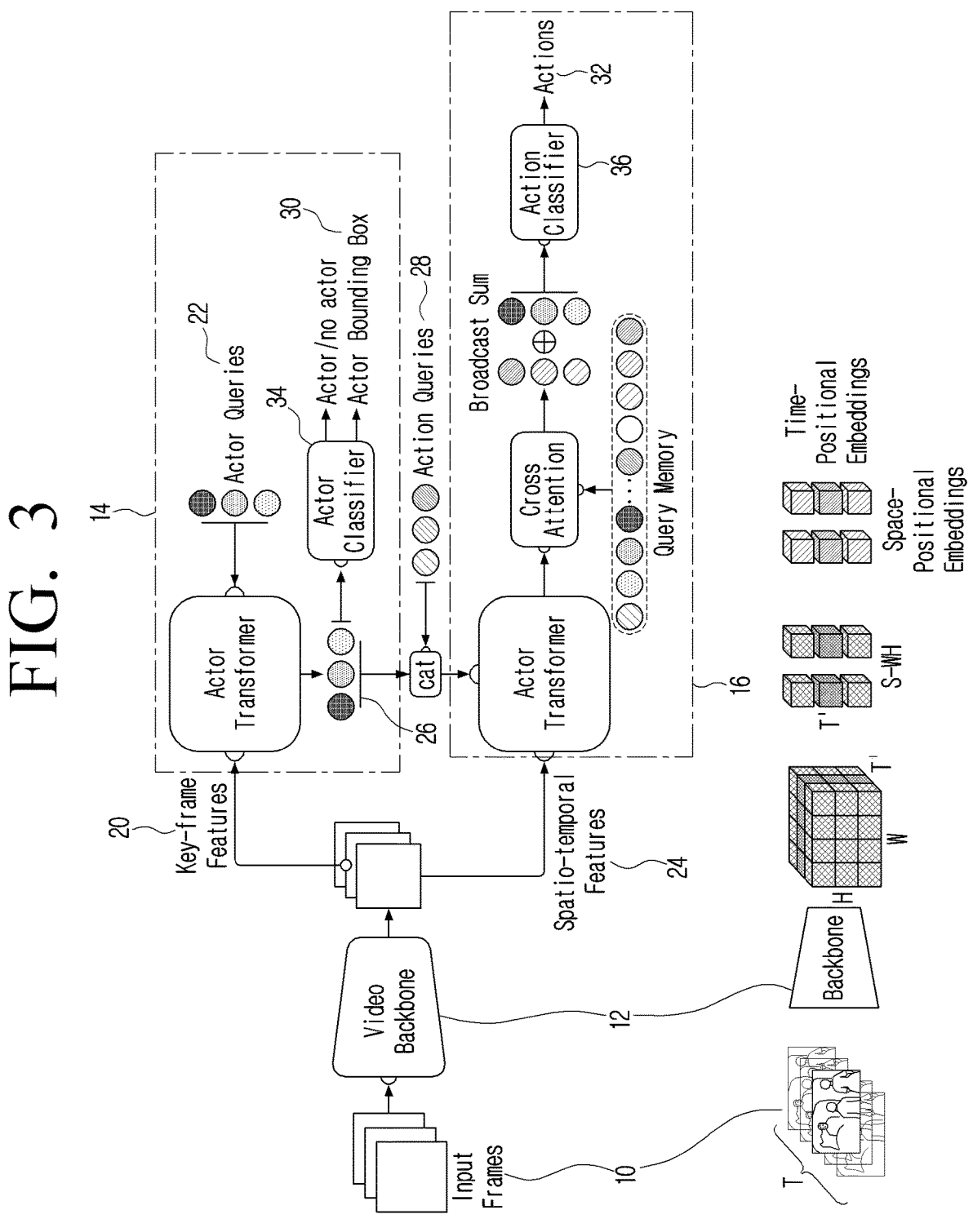
FIG. 3 is a schematic diagram of a machine learning, ML, model for video action classification.

Overview of Actor-Action Transformer. To alleviate the aforementioned learning difficulties, the present techniques disentangle the DETR head into two parallel heads, namely an Actor Transformer 14 for actor detection, which operates over the backbone features at the keyframes only, and an Action Transformer 16 for action detection, which operates over all spatio-temporal features. An overview of the approach is shown in FIG. 3. FIG. 3 is a schematic diagram of a machine learning, ML, model for video action classification, which provides some more details relative to FIG. 1. Both the actor transformer module 14 and action transformer module 16 share the same backbone 12 for feature extraction, and will have their corresponding set of learnable queries, coined actor queries 22 and action queries 28, respectively. This alleviates much of the computational burden introduced by two-stage approaches which use two backbones that additionally operate at two different image resolution. In order to match actors with actions after each head's predictions, a conditional actor-action matching loss is introduced. Finally, the actor-action queries can be readily used to construct a compressive and efficient memory, coined query memory, that is used for modelling long-term dependencies and interactions which seem to critical for improving classification accuracy on the AVA dataset.

In summary, the goal of the present techniques is to estimate, for a given frame, the bounding boxes of the actors in the image, as well as their corresponding actions. A clip 10 consisting of 64 frames around the central frame of interest is first sampled, to be fed into the backbone network 12. The backbone produces a feature tensor T'WH×d keeping a subsampled spatial resolution HW and temporal dimension T'. Each of the spatio-temporal features is a d-dimension vector.

It will be understood that the number of frames in clip 10 may vary. Each set of frames 10, also referred to herein as a 'video clip' or a 'clip', may comprise a predefined number of frames. For example, the set of frames may comprise 64 sequential frames, which may equate to two seconds of video time. This may be the time needed to accurately detect and classify actions. The next set of frames may be the next 64 frames in the video. Alternatively, to further reduce the computational complexity, the set of frames may comprise every other frame in a two-second window, i.e. 32 frames.

The spatial features are flattened and tiled, forming a tensor of T'×HW tokens with d dimensions each. A set of sinusoidal positional embeddings is computed in order to preserve the spatio-temporal ordering of the input sequence.

Actor Transformer. The Actor Transformer module 14 aims to localize the actors in the scene, i.e. to detect the bounding boxes corresponding to the actors. It is important to highlight that the present techniques aim at detecting actors and not persons, as the former constitute the persons of Interest in a given scene, i.e. those that are performing a specific action. In the present techniques, the actor transformer module 14 will focus on detecting only those actors that are performing one of the target actions.

It is observed that detecting actors can be cast as a similar problem to that of object detection, where the goal is to detect the bounding boxes in the key frame of a video clip, and classify them as either actor or no actor. This is different to using a standard person detector in that the interest here is in detecting whether a bounding box corresponds to an actor or not, with an actor being a person performing one of a set of specific, pre-defined target actions (e.g. "jumping"

and "running"). For instance, not all persons in AVA are deemed as actors. This allows the development of the Actor Transformer akin to DETR for object detection. To do so, a DETR encoder-decoder architecture is used, where the input to the encoder are the central features $z_c=z_{[T/2]}\in \mathbb{R}^{d\times S}$. Referring to the bottom of FIG. 3, considering the geometric structure of the task, the actor transformer module 14 is fed only with the features corresponding to the key frames. In some cases, the key frame may be the central frame, i.e. the features corresponding to the temporal centre of the output tensor from the backbone (shown by the shaded region of the H×W×T box in FIG. 3). Since T' is even, the features corresponding to the central frame are interpolated from the features of [T'/2] and [T'/2]. The positional embeddings are also sampled the same way (shown by the shaded region of the positional embedding boxes in FIG. 3).

To account for the permutation-invariant property of the attention layers, we follow the standard practice for transformers and inject spatial positional embeddings $e^s$ to the input of each attention layer. The transformer $E_{actor}$ has $L_o$ layers and produces output features $$z_c^{L_o} = E_{actor}(z_c, e^s) \in \mathbb{R}^{d\times s}.$$

The input to the transformer decoder $D_{actor}$ is the learnable actor queries 22 $o\in \mathbb{R}^{N\times d}$, where N is the number of learnable queries. The output actor queries 26 are then defined as:

$$o^{L_o}=D_{actor}(o, D_{actor}(z_c,e^s)) \tag{4}$$

The output actor queries 26 $o^{L_o}$ are decoded by an actor classifier 34 for box regression and binary classification into N final predictions $$\{\hat{y}_i\}_{i=1}^N.$$

The predictions of the actor classifier 34 include the normalized bounding box 30 coordinates $\hat{b}_i\in[0,1]^{4^\wedge}$ and the binary class probabilities $\hat{y}_i$ indicating whether the bounding box belongs to an actor or not (i.e. no-object Ø). Following DETR, the predictions are matched to the ground-truths, where every annotated box is considered as an actor, by finding the optimal bipartite matching as a permutation σ of the N predictions. The queries (i.e. the output bounding boxes 30) that are not assigned to an annotated actor are set to class no actor, denoted as Ø. The detection loss $\mathcal{L}_{det}$ is then computed as in Equation 3, where the CE loss is replaced by a binary focal loss for the actor/no-actor objective.

Action Transformer. The Action Transformer module 16 aims to describe the latent representations of the classes that are present in the clip (i.e. the input frames 10), without consideration to how the activated classes match the bounding boxes 30. The actor-action matching schedule described below assigns the output action queries to each bounding box in a seamless way.

For the Action Transformer module 16 architecture, it is observed that backbones based on Vision Transformers are already good encoders, and can be considered as deeper encoders that replace the encoder of the DETR head. It is thus proposed to use only a transformer decoder $D_{action}$ that is directly parsed with the backbone features. The positional embeddings are directly added to the backbone features. Separate space-time positional embeddings are used, denoted by $e^s$, $e^t$, resulting in the positional embeddings $e^{st}=e^s\oplus e^t$, which have same dimensions as the backbone features z.

The features $z^{L_p}$ are parsed to the transformer decoder along with the decoder queries. The present techniques propose a multimodal Action Transformer Decoder where the learnable action queries 28 $p\in \mathbb{R}^{M\times d}$ are concatenated with the output actor queries 26 o coming from the Actor Transformer module 14. The input queries to the Action Transformer module 16 are the M+N queries. The output of the decoder $D_{action}$ is defined as:

$$\hat{p}^{L_p}=D_{action}([p;\ o^{L_o}],z+e^{st}) \tag{5}$$

The output queries $\hat{p}^{L_p}\in \mathbb{R}^{(M+N)\times d}$ carry the actor-action information from the clip 10. No loss is applied directly to the output queries from the Action Transformer.

Actor-Action Matching. Recall that the output of the Actor Transformer module 14 is a set of N actor embeddings, with their corresponding bounding box 30 and class predictions (with class being actor/no actor). The output of the Action Transformer module 16 is a set of M+N action-actor embeddings. Each actor bounding box 30 now needs to be assigned to a corresponding class. Rather than first assigning the action queries with a class and then perform actor-action matching, it is proposed to perform a conditional query bipartite matching. In particular, all action queries are conditioned to the actor queries, generating anew set of N×M actor-action embeddings. Denoting by $\tilde{p}\in \mathbb{R}^{M\times d}$ the first M rows of $\hat{p}^{L_p}$, and by $\hat{o}\in \mathbb{R}^{N\times d}$, the last N rows of $\hat{p}^{L_p}$, the conditional actor-action queries are defined as:

$$o_c=\hat{o}\oplus\tilde{p}\in \mathbb{R}^{N\times M\times d} \tag{6}$$

These actor-action queries are then forwarded to an action classifier 32 $W_c\in \mathbb{R}^{d\times c}$ which produces the conditional class predictions 32 $c\in \mathbb{R}^{N\times M\times c}$ with C being the action classes.

The bipartite matching is now straightforward: given the actor/no actor and bounding box predictions computed by the Actor Transformer module 14 for actor queries o, it is possible to directly filter out from $o_c$ the conditional queries corresponding to detected actors. To do so, it is noted that each assignment $\sigma_i$ from the Actor Transformer module 14 is in one-to-one correspondence with each subset of conditional class predictions $c_{\sigma_i}\in \mathbb{R}^{M\times c}$. Then, the matching boils down to applying bipartite matching between the M queries assigned $\mathbb{R}^{M\times c}$ to a particular bounding box, and the ground-truth classes activated on it. In a multi-class setting like that of AVA 2.2 where the actions are not mutually exclusive, this assignment allows the conditional queries to attend to a particular action only, following the one-class set assignment motivation of DETR. The bipartite matching uses a simple cross-entropy cost between the per-query predictions and the ground-truth, and a focal loss is applied to each query with their corresponding unique assignment. All conditioned queries not assigned to a bounding box, or not matched to a ground-truth class for a particular bounding box are assigned to the Ø class.

Training. After computing the detection loss $\mathcal{L}_{det}$ and the classification loss $\mathcal{L}_{cl}$, the model is then trained end-to-end with a combination of both losses:

$$\mathcal{L}_{det}+\alpha\cdot\lambda_{cl}\mathcal{L}_{cl} \tag{7}$$

with a weighting hyperparameter $\lambda_{cl}\in \mathbb{R}$, and $\alpha\in[0,1]$ as a warm-up coefficient that ramps up from zero to one at the start of training (e.g., the first 2 epochs). This helps the model learn to localize the actors first, then learn their actions. Note that similar to DETR, auxiliary decoding losses are used at each decoder layer of both the actor and action transformers to further accelerate convergence.

Inference. During inference, the actor queries 22 are assigned a bounding box 30 and an actor/no actor class through the head of the Actor Transformer module 14. For each detected bounding box 30, the class probabilities for each corresponding conditional actor-action query are computed, and those with the minimum confidence are selected. The final set of class probabilities is computed by selecting for each class logit the value with maximum confidence over the class probabilities of the selected queries. The output vector with class probabilities is assigned to the bounding box computed by the actor transformer head.

Query Memory. At the output of the Action Transformer module 16 (i.e. before the Actor-Action Matching step), the queries $\hat{p}^{L_p}$, is a set of M+N latent embeddings that convey the latent clip-based information. This allows for an automatic memory compression mechanism, whereby the M embeddings and only the subset N'<N of the ô queries corresponding to the detected bounding boxes can be stored, and used in subsequent clips to enable a long-term temporal support. To do so, the present techniques use a causal memory, where only the embeddings corresponding to past clips are used.

To make use of the temporal support provided by the past T clips, a cross-attention layer is placed at the output of the Action Transformer module 16 (see FIG. 3), where the latent embeddings $\hat{p}$ attend to the stored embeddings $[\hat{p}_{t-T}', \ldots, \hat{p}_t']$. The network is then fine-tuned using the memory along with the cross-attention layer. At inference time, it is observed that while the memory and the current clip embeddings need to be computed by two different networks, most of the computation can be done in parallel: for a given clip, the first network is tasked with extracting the memory for subsequent clips, and the second performs the actor-action detection by attending to the past memory. Because the cross-attention layer attends to only features from the past, the memory construction and the attention to the memory are computed at the same time, i.e. without introducing any latency to the inference process. While introducing more computations, it is noted that a) most of these can be performed simultaneously, and b) the present memory mechanism maintains the single-stage approach.

Experiments: Datasets. Results are reported on three common benchmarks for action localization. AVA 2.2 is a large-scale dataset including 299 videos of 15-minute duration, with training/validation partitions split into 235 and 64 videos respectively. Box labels and annotations are provided at keyframes sampled at 1 fps, resulting in 211 k and 57 k training and validation clips, each of 64 frames, respectively. The standard evaluation protocol is followed, and results are reported for the 60-class subset of annotated actions. UCF101-24 is a subset of UCF101 that contains 24 classes in 3207 untrimmed videos, and contains box labels and annotations in a per-frame basis. Following prior work, the revised annotations are used from Singh et al and the results are reported on split-1. JHMDB51-21 contains 928 trimmed videos labelled with 21 action categories. The results are reported on the three splits. Following related work, the mean average precision (mAP) is reported at IoU of 0.5.

Implementation details. In one example, the backbone 12 is MViTv2S-16×4, pretrained on Kinetics-400, which operates over T=16 frames sampled at a stride of τ=4 frames. Because an image resolution of 256 is used, the stride is removed on the last spatial downsampling layer to preserve a spatial resolution of 14 pixels at the output, necessary for bounding box detection. The backbone is ablated, comparing with MViTv1-B16×4 and SlowFast-50-32×2, both also pretrained on Kinetics-400. The Actor Transformer 14 follows the improved Conditional DETR architecture of Meng et al, due to its improved convergence properties. Both the encoder and decoder contain 6 layers. The transformer is initialized from the Conditional DETR-DC5-R101 model trained on the COCO detection dataset. The number of Actor Queries is N=50 and the embeddings are 256 dimensions. The Action Transformer 16 also follows the Conditional DETR decoder for improved convergence. For the explicit case where the backbone 12 is a SlowFast, 3 encoder layers are incorporated to cope with the lack of self-attention layers in the backbone. The weights are again initialized from Conditional DETR checkpoint. The number of Action Queries is set to M=80. Ablation is performed on the number of queries. The attention to the Query Memory consists of a 2-layer cross-attention module followed by a FFN and skip connection.

All experiments are done using PyTorch, building upon the SlowFast publicly available code and the CDETR and DETR repositories. The models are trained using AdamW with weight decay 0.0001, on 8 GPU cards with 1 clip per device. The model is trained for 15 epochs with initial learning rate of 0.0001 and cosine decay with no restarts. During training, random re-scaling is applied between 240 and 384 pixels in the short side, keeping a maximum of 512 on the longest side. The weights losses in Eq. (3) are set to λ1=2.0, λ2=5.0 and λ3=2.0, and λc1=6.0 and α of Eq. (7) ramps-up to one in the first two epochs. All the results are reported using a single view with the input images resized to a short side of 256 pixels (unless explicitly stated), keeping the aspect ratio. To construct the memory, the embeddings are extracted and two cross-attention layers are added on top of the Action Transformer. Following observations from prior work, a FIFO memory is maintained with 30 clip embeddings.

Ablation Studies. Ablation studies are performed on the AVA dataset to analyze a variety of model hyperparameters, and in particular, the trade-off between complexity and performance by means of the mean Average Precision (mAP@0.5 IoU).

Choice of backbone. First, the impact of the backbone 12 on the performance is analysed. FIGS. 4A to 4C show results of ablation experiments done on the evaluation partition of AVA 2.2. FIG. 4A shows the trade-off between the complexity and the performance of the present techniques using as backbone a SlowFast or the Multi-scale Vision Transformer architectures. It is observed that the latest MViTv2 version offers the best performance in accuracy and complexity. FIG. 4A shows the performance and complexity, measured by number of GFLOPs and number of parameters, of a SlowFast network with a Resnet50 using 32 and 8 frames for the fast and slow pathways, respectively, as well as of MViTv1 and MViTv2, which use 16 frames sampled at a stride of 4. While all backbones deliver competitive results (see FIG. 6), it is observed that MViTv2 offers the best trade-off of all studied backbones.

Number of queries. The impact of varying the number of actor/action queries is shown in FIG. 4C, using as backbone the MViTv1 architecture. As commonly reported in the DETR literature, the number of total queries is a limiting factor in terms of memory consumption. In addition, it is noted that while inference number of FLOPs is not crucially affected by an increase in the number of queries, the training becomes problematic with a large number of total queries due to the fact that the gradients with respect to the action queries accumulate according to the number of conditioned outputs. It is observed that there is little variability in the results by adding/removing queries. The extra queries tend to model the least frequent combinations of actor/action pairs. No improvement was observed by adding a large number of queries, as the frequency of activations for the additional queries is very low.

Finetuned vs frozen memory. A query memory approach is also considered, where the network frozen is frozen and only the cross-attention layers are learned with a new classifier Wc. In this setting, the cached embeddings and the current clips are extracted by the very same network. The results shown in FIG. 4B indicate that the performance gain for a finetuned network is larger than using a frozen one. The gain in the latter comes at much less computational cost. Specifically, FIG. 4B shows the results, using as backbone an MViTv2 architecture, corresponding to using a frozen memory where only the cross-attention layers are trained, compared to using a finetuned network. it is observed that keeping the backbone frozen is more efficient but comes with lower gain, whereas refining the whole network to adapt to the memory features results in improved performance.

Figure 5:
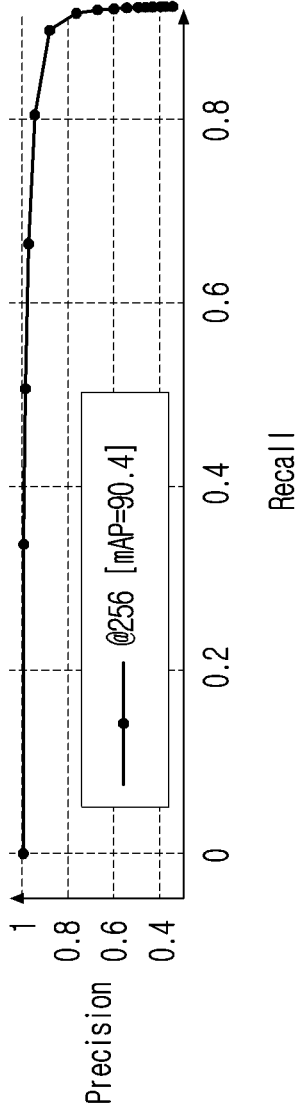
FIG. 5 shows results of experiments on the precision and recall of the actor detector using the MViTv2 backbone.

Person Detection. The capacity of the present Actor Transformer to detect actors in the given videos is analysed. The Actor Detector includes a confidence estimator in the actor-no actor classification. FIG. 5 shows results of experiments on the precision and recall of the actor detector using the MViTv2 backbone. The average precision @0.5 IoU of the present model is 90.4. Based on the precision and recall, the actor class threshold is set to 0.35, resulting in a precision and recall of 88.1 and 91.2, respectively. As a comparison, the Faster-RCNN model, which is finetuned on AVA and that works at 512 resolution, achieves a precision and recall of 90.7 and 91.1, respectively.

State-of-the-art Comparison: AVA 2.2. The bulk of the results of the experiments are shown in FIG. 6, where * indicates that the FLOPs include those of the Faster RCNN-R101-FPN detector (246 GLOPs), and (3122) represents inference at an image resolution of 312 pixels. For fair comparison, a comparison is only made against methods that are pretrained on Kinetics-400. The methods that work on pre-computed bounding boxes and hence are two-stage are denoted with ✗, and those that are single-stage are denoted with ✓. In addition, the computational demand of each of these methods is reported. For those that are not single stage, the FLOPs of the detection stage is added. All two-stage methods in FIG. 6 use the bounding boxes generated by SlowFast, which used a FasterRCNN-R101FPN network, that takes 246 GFLOPs for an input resolution of 512 pixels. The present method clearly surpasses competing methods by a large margin (+1 mAP) being less computationally expensive. For reference, the state-of-the-art results on AVA 2.2, which are those of MeMViT-24, are included. Notably, these are achieved working at an image resolution of 312 for the second stage.

State-of-the-art Comparison: UCF101-24. The results of the present techniques on UCF101-24 are shown in FIG. 7. It is observed that the present method sets new state of the art results even surpassing two-stage methods like ACAR and single-stage methods that need a memory bank like YOWO.

State-of-the-art Comparison: JHMDB51-21. The results of the present techniques on JHMDB51-21 are shown in FIG. 8. The present method is only surpassed by WOO which is pretrained on Kinetics-600 and is computationally more demanding (see FIG. 6).

Thus, the present techniques provide a novel actor-action transformer architecture for action localization, which splits the problem into two subtasks, namely Actor Detection and Action Detection, with a novel actor-action matching strategy. The present techniques also provide an efficient mechanism for modelling long-term dependencies. The present techniques deliver state of the art results on three benchmarks using a single-stage approach without the need of working at high image resolution, being computationally efficient.

Figure 9:
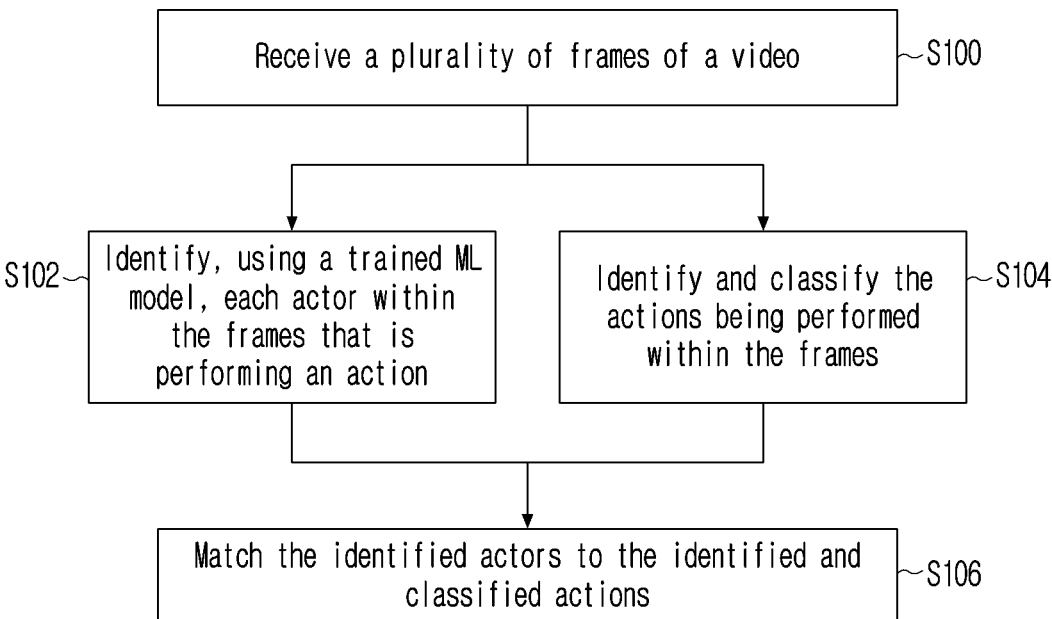
FIG. 9 is a flowchart of example steps to perform video action classification using a trained machine learning, ML, model.

FIG. 9 is a flowchart of example steps to perform video action classification using a trained machine learning, ML, model. The method comprises: receiving a plurality of frames of a video (step S100); inputting the plurality of frames into the ML model and using the trained model to: identify, within the plurality of frames, whether there are any actors performing an action in the frames (step S102); identifying and classifying, when an actor is identified, the actions being performed in the frames (step S104); and matching the identified actors to the identified and classified actions.

The method may comprise: using a backbone network 12 of the ML model to extract spatial features and temporal features from the plurality of frames.

The step of identifying each actor within the plurality of frames may comprise: applying an actor transformer module 14 of the ML model to the extracted spatial features and temporal features, and predicting a bounding box around each actor performing an action. Classifying the action performed by each actor may comprise: applying an action transformer module 16 of the ML model to the extracted spatial features, and predicting a class for each actor performing an action. These processes are now described in more detail with reference to FIGS. 10 and 11.

FIG. 10 is a flowchart of example steps performed by the actor transformer module 14 to identify actors within the plurality of input frames. The actor localization sub-branch of the ML model (i.e. the actor transformer module 14) builds on the DETR, where the goal is to use a set of learnable queries to convey not only the bounding box information, but whether the detected person in an image is an actor of interest (i.e. it is performing an action of interest) or belongs to the background. In other words, the actor transformer module 14 identifies or detects each actor within the plurality of frames that is performing a specific action, and not simply every actor. The specific action may be pre-determined, and there may be a plurality of specific actions of interest. For example, there may be 80 action types which are of interest, and only the actors performing any one or more of these action types may be identified by the actor transformer module.

As mentioned above, the actor transformer module 14 may comprise an encoder-decoder architecture. Thus, the method performed by the actor transformer module 14 may comprise: inputting, into an encoder of the actor transformer module 14, key-frame features 20, $z_c = z_{[T/2]} \in \mathbb{R}^{d \times S}$, extracted by a backbone network 12 (step S200); and outputting, from the encoder, a self-attention result for the extracted spatial features and temporal features (step S202).

The method then comprises inputting, into a decoder of the action transformer module 16, the self-attention result output from the encoder and a set of actor queries 22, $o \in \mathbb{R}^{N \times d}$, where N is the number of queries (step S204). The output of the decoder is a set of final actor queries 26. The method comprises inputting the final actor queries 26 into an actor classifier 34 for box regression and binary classification into N final predictions (step S206). Thus, the method comprises outputting, from the actor classifier 34, coordinates of a predicted bounding box 30 around each actor and probabilities (or a classification score) indicating whether each bounding box 30 contains an actor or not (step S208).

FIG. 11 is a flowchart of example steps performed by the action transformer module 16 to identify and classify the actions performed by actors identified by the actor transformer module 14. The action localization sub-branch of the ML model (i.e. the action transformer module 16), which also builds on DETR, aims at learning the classes and their relations in a given clip, regardless the bounding boxes. As mentioned above, the action transformer module 16 may comprise an encoder-decoder architecture. However, when the backbone network 12 used to extract the features from the input is based on self-attention, the encoder itself may not be required. Thus, the method performed by the action transformer module 16 may comprise: inputting, into a decoder of the action transformer module 16, the extracted spatial and temporal features, the set of final actor queries 26, o, output by the actor transformer module 14, and a set of action queries (step S300). The output of the decoder is a set of final action queries, $\hat{p}^{L_P} \in \mathbb{R}^{(M+N) \times d}$, that include actor information as well as action information (step S302). The output of the decoder of the action transformer module 16 is input into an action classifier 32 $W_c \in \mathbb{R}^{d \times c}$ which produces the conditional class predictions 32 $c \in \mathbb{R}^{N \times M \times c}$ with C being the action classes. That is, the method comprises outputting, from the action classifier, a predicted class for each actor performing an action and a confidence value (step $\mathbb{R}^{N \times M \times c}$ S304).

The output of the actor transformer module 14 (step S208) and the output of the decoder of the action transformer module 16 (step S304) now need to be matched together. This may be done using the bipartite matching process described above.

As mentioned above, the input to the encoder of the action transformer module 16 is a combination of the final actor queries (at the output stage of the actor transformer decoder) and the action queries. In particular, each of the actor queries is copied M times, and each set of M copies is added to the corresponding action queries, thereby generating an input set of NxM actor-action queries. The action classifier 36 outputs a 2-d vector for each of the NxM queries indicating the likelihood of a specific actor query matching a specific action query.

Computing self-attention on the set of NxM queries is computationally demanding, as these would normally lie on the order of 10 k total number of queries. In addition, most of the actor and action queries will not even activate at a specific video, and thus computing whether they match or not is of no use. For this reason, a simpler version is kept whereby, first the N' actor queries corresponding to those detected as actors are chosen, and the M' action queries with a confidence level above a given threshold (i.e. deemed to represent an action in the given clip). The matching is then performed on a subset of N'xM' queries, which is often negligible. Thus, the matching may comprise: matching the predicted bounding boxes with predicted classes for each actor having a corresponding confidence value greater than a predetermined threshold value. That is, some of the predictions made by the actor transformer module and/or action transformer module may be ignored or discarded to concentrate on those predictions that are associated with a high confidence value. This further reduces the computational complexity of the method.

The output of the matching process indicates whether a given bounding box is associated to the class specified by the corresponding action query. In AVA, some actions are not mutually exclusive, and a particular bounding box might be labelled with more than one class at a time (e.g. "a person is sitting and looking at someone else"). The proposed matched allows such events to occur by assigning a positive score to combinations of actor queries and action queries that carry the same bounding box but different actions. In order to combine more than one action query into the label assignment for a given bounding box, the max operator is applied, selecting for each logit the maximum value detected in the assigned action queries. The final set of logits for a given bounding box are then given by the combination of the corresponding logits of each of the assigned action queries. Thus, the matching may comprise: matching each predicted bounding box with two or more predicted classes.

The model of the present techniques may be used to perform video compression. Thus, the method for video action classification may further comprise: compressing, using the likelihood of a specific bounding box around an actor being associated with a predicted class for that actor, the plurality of frames of a video.

The model of the present techniques may use the video action classification performed for a first set of frames of a video to classify a second set of frames of the video. The query memory technique described above may aid this process.

Figure 12:
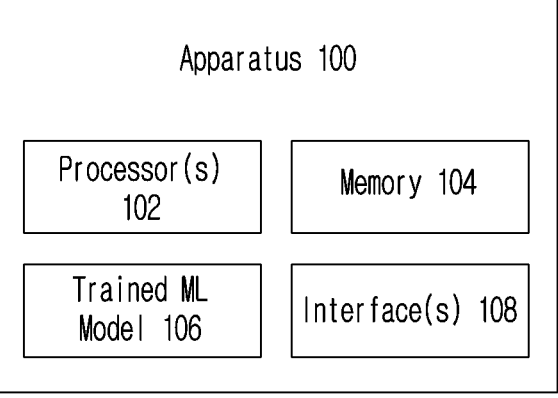
FIG. 12 is a block diagram of an apparatus for performing video action classification.

FIG. 12 is a block diagram of an apparatus 100 for performing video action classification. The apparatus 100 comprises a trained ML model 106 of the type described herein.

The apparatus comprises at least one processor 102 coupled to memory 104. The at least one processor 102 may comprise one or more of: a microprocessor, a microcontroller, and an integrated circuit. The memory 104 may comprise volatile memory, such as random access memory (RAM), for use as temporary memory, and/or non-volatile memory such as Flash, read only memory (ROM), or electrically erasable programmable ROM (EEPROM), for storing data, programs, or instructions, for example.

The apparatus comprises at least one interface 108 for receiving a plurality of frames of a video. The interface may be, for example, a video/image capture device, or an interface for receiving frames of a video captured by an external video/image capture device.

The at least one processor 102 inputs the plurality of frames into the ML model 106 and uses the trained model to: identify each actor within the plurality of frames that is performing an action; identify and classify, when at least one actor is identified, the actions being performed in the frames; and match the identified actors to the identified and classified actions.

Figure 13:
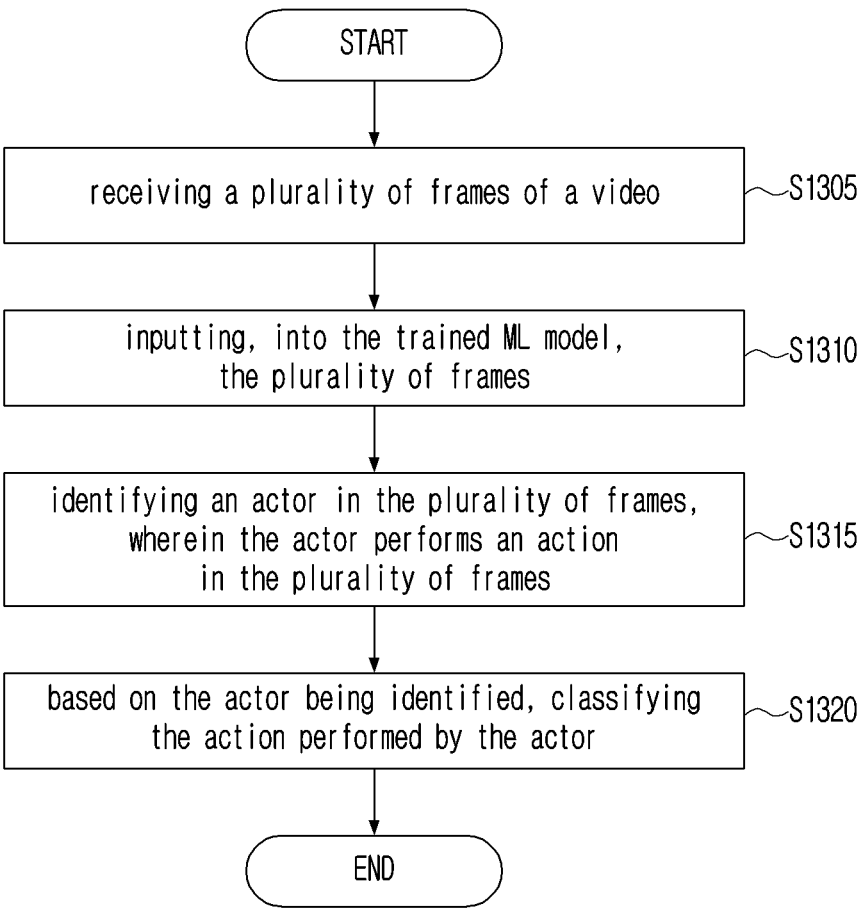
FIG. 13 is a flowchart illustrating a controlling method of an electronic apparatus.

FIG. 13 is a flowchart illustrating a controlling method of an electronic apparatus 100.

Referring to FIG. 13, a method of controlling an electronic apparatus for performing video action classification using a trained machine learning, ML, model, the method includes receiving a plurality of frames of a video (S1305), inputting, into the trained ML model, the plurality of frames (S1310), identifying an actor in the plurality of frames (S1315), wherein the actor performs an action in the plurality of frames, and based on the actor being identified, classifying the action performed by the actor (S1320).

The method may further include extracting spatial features and temporal features from the plurality of frames by using a backbone network in the trained ML model.

The identifying the actor within the plurality of frames (S1315) may include applying an actor transformer module in the trained ML model to the extracted spatial features and temporal features from key frames of the plurality of frames, and predicting a bounding box around the actor performing the action.

The applying the actor transformer module to the extracted spatial features and temporal features may include inputting, into an encoder in the actor transformer module, the extracted spatial features and temporal features from the key frames, outputting, from the encoder in the actor transformer module, position features indicating potential positions of the actor in the key-frames, inputting, into a decoder in the actor transformer module, the position features output from the encoder in the actor transformer module, and a set of actor queries, and outputting, from the decoder in the actor transformer module, final actor queries. The predicting the bounding box around the actor performing the action may include inputting, into an actor classifier in the actor transformer module, the final actor queries, and outputting, from the actor classifier, coordinates of the bounding box for the actor and a classification score indicating a likelihood of the bounding box containing the actor.

The classifying the action performed by the actor (S1320) may include applying an action transformer module in the trained ML model to the extracted spatial features and temporal features, and predicting a class for the actor performing the action.

The applying the action transformer module to the extracted spatial features and temporal features may include inputting, into an encoder in the action transformer module, the extracted spatial features and temporal features, outputting, from the encoder in the action transformer module, action features indicating potential actions of the actor, inputting, into a decoder in the action transformer module, the action features output from the encoder in the action transformer module, the final actor queries output by the decoder in the actor transformer module, and a set of action queries, and outputting, from the decoder in the action transformer module, final action queries. The predicting the class for the actor performing the action may include inputting, into an action classifier in the action transformer module, the final action queries, and outputting, from the action classifier, the class for the actor performing the action and a confidence value corresponding to the class.

The method may further include matching the predicted bounding box with the predicted class for the actor, and obtaining a matching score indicating a likelihood of the predicted bounding box being associated with the predicted class.

The matching may include matching the predicted bounding box with the predicted class for the actor having the confidence value greater than a predetermined threshold value.

The matching may include matching the predicted bounding box with two or more predicted classes.

The method may further include compressing, using the matching score, the plurality of frames of the video.

The plurality of frames may be a first set of frames in the video. The method may further include classifying an action performed by the actor in a second set of frames in the video.

The first set of frames may be a subsequent set of the second set of frames.

The video action classification may be performed in real-time or near real-time.

The identified actor may be a human object or animal object.

The methods according to the various embodiments of the disclosure described above may be implemented in an application form installable in the electronic apparatuses of the related art.

Figure 14:
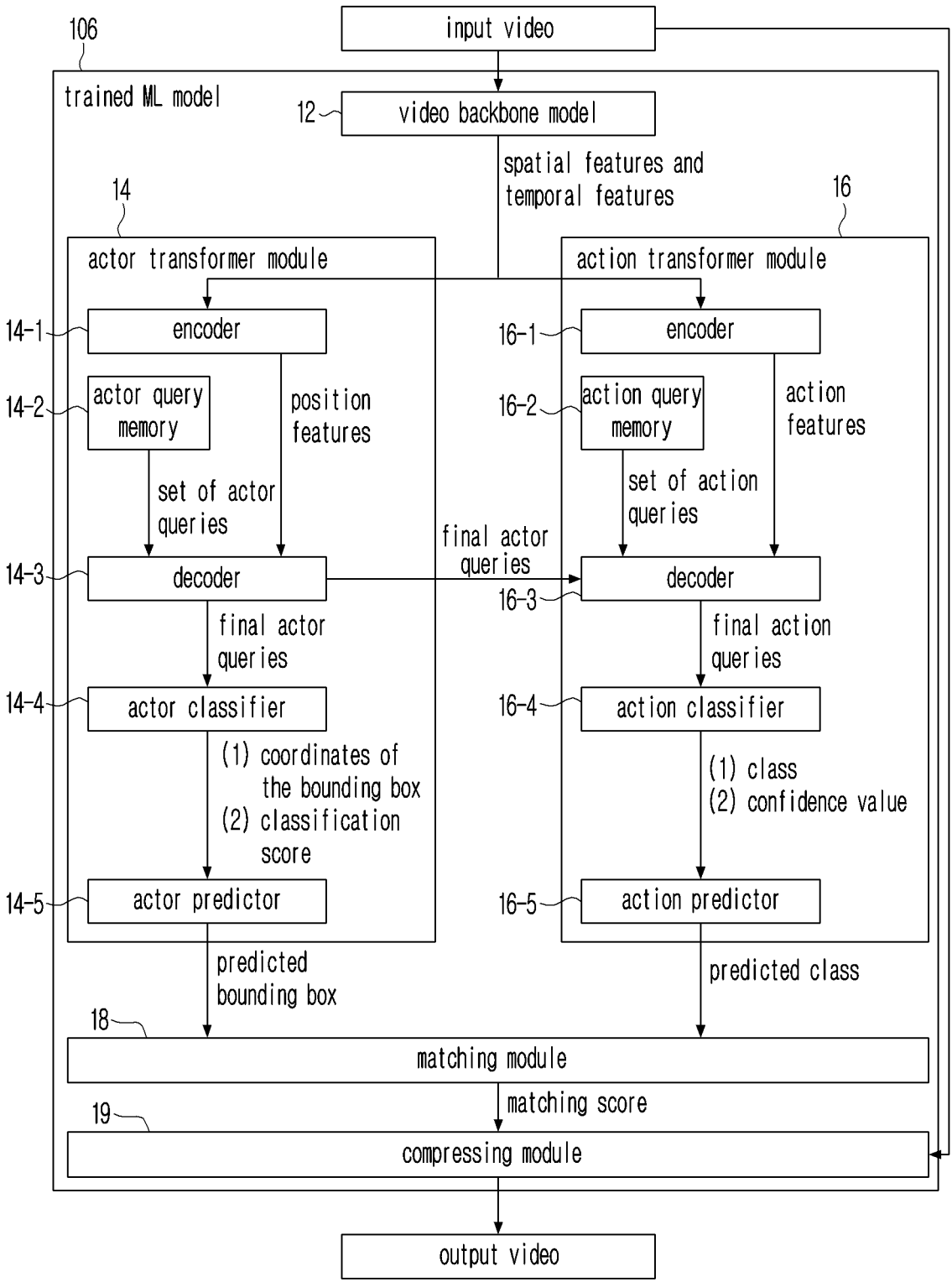
FIG. 14 is a block diagram illustrating a trained ML model of the electronic apparatus.

FIG. 14 is a block diagram illustrating a trained ML model 106 of the electronic apparatus 100.

Referring to FIG. 14, the apparatus 100 may include a trained ML model 106. The trained ML model 106 may include at least one of a video backbone model 12, an actor transformer module 14, an action transformer module 16, a matching module 18 or compressing module 19.

The apparatus 100 may store an input video. The input video may include a plurality of frames. The apparatus 100 may provide the input video to the trained ML model 106. The apparatus 100 may obtain an output video by inputting the input video to the trained ML model 106.

The video backbone model 12 may receive the input video. The video backbone model 12 may extract spatial features and temporal features from the plurality of frames in the input video. The spatial features may be described as spatial information or space information. The temporal features may be described as temporal information or time information.

The video backbone model 12 may identify key frames among the plurality of frames. The video backbone model 12 may extract spatial features and temporal features from in the key frames. The video backbone model 12 may provide the extracted spatial features and temporal features to the actor transformer module 14 and the action transformer module 16.

The actor transformer module 14 may identify an actor based on the extracted spatial features and temporal features. The identified actor may described as actor information or predicted bounding box. The predicted bounding box may indicate position of the identified actor.

The action transformer module 16 may identify an action of the actor based on the extracted spatial features and temporal features. The identified action may described as action information or predicted class. The predicted class may indicate classification of the identified action.

The actor transformer module 14 may include at least one of an encoder 14-1, an actor query memory 14-2, a decoder 14-3, an actor classifier 14-4 or an actor predictor 14-5.

The encoder 14-1 may receive the extracted spatial features and temporal features from the video backbone model 12. The encoder 14-1 may obtain position features based on the extracted spatial features and temporal features. The encoder 14-1 may provide the position features to the decoder 14-3.

The actor query memory 14-2 may store a set of actor queries. The actor query memory 14-2 may provide the set of actor queries to the decoder 14-3.

The decoder 14-3 may receive the position features from the encoder 14-1. The decoder 14-3 may receive the set of actor queries from the actor query memory 14-2. The decoder 14-3 may obtain final actor queries based on the position features and the set of actor queries. The decoder 14-3 may provide the final actor queries to the actor classifier 14-4.

The decoder 14-3 may provide the final actor queries to the decoder 16-3 in the action transformer module 16.

The actor classifier 14-4 may receive the final actor queries from the decoder 14-3. The actor classifier 14-4 may obtain coordinates of the bounding box and a classification score based on the final actor queries. The actor classifier 14-4 may provide the coordinates of the bounding box and the classification score to the actor predictor 14-5.

The actor predictor 14-5 may receive the coordinates of the bounding box and the classification score from the actor classifier 14-4. The actor predictor 14-5 may obtain (or predict) bounding box based on the coordinates of the bounding box and the classification score. The actor predictor 14-5 may provide the predicted bounding box to the matching module 18. The predicted bounding box may described as a final bounding box or actor information.

The action transformer module 16 may include at least one of an encoder 16-1, an action query memory 16-2, a decoder 16-3, an action classifier 16-4 or an action predictor 16-5.

The encoder 16-1 may receive the extracted spatial features and temporal features from the video backbone model 12. The encoder 16-1 may obtain action features based on the extracted spatial features and temporal features. The encoder 16-1 may provide the action features to the decoder 16-3.

The action query memory 16-2 may store a set of action queries. The action query memory 16-2 may provide the set of action queries to the decoder 16-3.

The decoder 16-3 may receive the action features from the encoder 16-1. The decoder 16-3 may receive the set of action queries from the action query memory 16-2. The decoder 16-3 may obtain final action queries based on the action features and the set of action queries. The decoder 16-3 may provide the final action queries to the action classifier 16-4.

The action classifier 16-4 may receive the final action queries from the decoder 16-3. The action classifier 16-4 may obtain class of action and confidence value corresponding the class based on the final action queries. The action classifier 16-4 may provide the class and the confidence value to the action predictor 16-5.

The action predictor 16-5 may receive the class and the confidence value from the action classifier 16-4. The action predictor 16-5 may obtain predicted class based on the class and the confidence value. The action predictor 16-5 may provide the predicted class to the matching module 18. The predicted class may described as a final class or action information.

The matching module 18 may receive the predicted bounding box (or actor information) from the actor transformer module 14. The matching module 18 may receive the predicted class (or action information) from the action transformer module 16. The matching module 18 may match the predicted bounding box with the predicted class. The matching module 18 may obtain a matching score based on the predicted bounding box and the predicted class. The matching module 18 may provide the matching score to the compressing module 19.

The compressing module 19 may receive the matching score from the matching module 18. The compressing module 19 may receive the plurality of frames in the input video. The compressing module 19 may compress the plurality of frames in the input video. The compressing module 19 may obtain the output video based on the compressed plurality of frames.

In addition, the methods according to the various embodiments of the disclosure described above may be implemented with only a software upgrade or a hardware upgrade of the electronic apparatuses of the related art.

In addition, the various embodiments of the disclosure described above may be performed through an embedded server provided in the electronic apparatus, or at least one external server from among the electronic apparatus and the display device.

Various embodiments described above may be implemented with software including instructions stored in a machine-readable storage media (e.g., computer). The machine may call an instruction stored in a storage medium, and as a device operable according to the called instruction, may include an electronic device according to the above-mentioned embodiments. Based on the instruction being executed by the processor, the processor may directly or using other elements under the control of the processor perform a function corresponding to the instruction. The instruction may include a code generated by a compiler or executed by an interpreter. The machine-readable storage medium may be provided in the form of a non-transitory storage medium. Herein, 'non-transitory' merely means that the storage medium is tangible and does not include a signal, and the term does not differentiate data being semi-permanently stored or being temporarily stored in the storage medium.

In addition, a method according to the various embodiments described above may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product may be at least stored temporarily in a server of a manufacturer, a server of an application store, or a storage medium such as a memory of a relay server, or temporarily generated.

In addition, each of the elements (e.g., a module or a program) according to the various embodiments described above may be formed as a single entity or a plurality of entities, and some sub-elements of the above-mentioned sub-elements may be omitted, or other sub-elements may be further included in the various embodiments. Alternatively or additionally, some elements (e.g., modules or programs) may be integrated into one entity to perform the same or similar functions performed by the respective elements prior to integration. Operations performed by a module, a program, or another element, in accordance with various embodiments, may be executed sequentially, in a parallel, repetitively, or in a heuristic manner, or at least some operations may be executed in a different order, omitted or a different operation may be added.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents.

There are a number of use cases of the present techniques, some of which are outlined below.

AI Fitness: The method of the present techniques will be able to predict, for multiple people simultaneously, their localization in the scene as well as which action is each person performing. With such a targeted localization it will be possible to accommodate a system for performance evaluation, as well as for automatic synchronization with the fitness instructor for error feedback. The system may embed the capacity of being deployed in multi-person scenarios where friends or family can all perform some collaborative workouts.

AI Kitchen: The method of the present techniques will be able to detect a person in a kitchen while cooking, identifying the key actions that the cook is doing, to properly assist him/her in the cooking procedure. The method will have the capacity to be extended for the case of multiple people preparing a complex recipe without incurring in extra computational cost.

AI Sports: The method of the present techniques will be able to handle scenarios where it is desirable to track e.g. football players, with the aim of automatically analysing their performance and estimate their capacities to foresee an interesting moment in a game (e.g. a goal). Such applications are of interest for the main European competitions such as The Premier League or La Liga.

Robotics: The method of the present techniques will be able to be integrated in a robot to enable it with the capability of scene understanding under the scenario where multiple people are interacting.

Retail: The method of the present techniques can identify the actions carried out by a variety of people simultaneously, which is of interest when e.g. customers aim to interact with an immersive advertisement. Under this setting, moving towards a system with the capacity to understand human actions in real time is a must.

REFERENCES

DEtection TRansformer, or DETR: Carion, N., Massa, F., Synnaeve, G., Usunier, N., Kirillov, A., Zagoruyko, S., "End-to-end object detection with transformers", European conference on computer vision. pp. 213-229. Springer (2020)).

AVA dataset: Chunhui Gu, Chen Sun, David A. Ross, Carl Vondrick, Caroline Pantofaru, Yeqing Li, Sudheendra Vijayanarasimhan, George Toderici, Susanna Ricco, Rahul Sukthankar, Cordelia Schmid, and Jitendra Malik. AVA: A video dataset of spatiotemporally localized atomic visual actions. CVPR, 2018

TubeR: Jiaojiao Zhao, Xinyu Li, Chunhui Liu, Shuai Bing, Hao Chen, Cees G M Snoek, and Joseph Tighe. Tuber: Tube-transformer for action detection. arXiv preprint arXiv:2104.00969, 2021

MViT: Haoqi Fan, Bo Xiong, Karttikeya Mangalam, Yanghao Li, Zhicheng Yan, Jitendra Malik, and Christoph Feichtenhofer. Multiscale vision transformers. In Proceedings of the IEEE/CVF International Conference on Computer Vision, pages 6824-6835, 2021

MViT-v2: Yanghao Li, Chao-Yuan Wu, Haoqi Fan, Karttikeya Mangalam, Bo Xiong, Jitendra Malik, and Christoph Feichtenhofer. Mvitv2: Improved multiscale vision transformers for classification and detection. CVPR, 2022

AVA 2.2 dataset: Ang Li, Meghana Thotakuri, David A Ross, Joao Carreira, Alexander Vostrikov, and Andrew Zisserman. The ava-kinetics localized human actions video dataset. arXiv preprint arXiv:2005.00214, 2020.

UCF101-24 dataset: Khurram Soomro, Amir Roshan Zamir, and Mubarak Shah. Ucf101: A dataset of 101 human actions classes from videos in the wild. arXiv preprint arXiv:1212.0402, 2012

JHMDB51-21 dataset: Hueihan Jhuang, Juergen Gall, Silvia Zuffi, Cordelia Schmid, and Michael J Black. Towards understanding action recognition. In Proceedings of the IEEE international conference on computer vision, pages 3192-3199, 2013

Singh et al: Gurkirt Singh, Suman Saha, Michael Sapienza, Philip H S Torr, and Fabio Cuzzolin. Online real-time multiple spatiotemporal action localisation and prediction. In Proceedings of the IEEE International Conference on Computer Vision, pages 3637-3646, 2017

Kinetics-400 dataset: Will Kay, Joao Carreira, Karen Simonyan, Brian Zhang, Chloe Hillier, Sudheendra Vijayanarasimhan, Fabio Viola, Tim Green, Trevor Back, Paul Natsev, et al. The kinetics human action video dataset. arXiv preprint arXiv:1705.06950, 2017

MViTv1-B16×4: Haoqi Fan, Bo Xiong, Karttikeya Mangalam, Yanghao Li, Zhicheng Yan, Jitendra Malik, and Christoph Feichtenhofer. Multiscale vision transformers. In Proceedings of the IEEE/CVF International Conference on Computer Vision, pages 6824-6835, 2021

SlowFast-50-32×2: Christoph Feichtenhofer, Haoqi Fan, Jitendra Malik, and Kaiming He. Slowfast networks for video recognition. ICCV, 2019

CDETR/Meng et al: Depu Meng, Xiaokang Chen, Zejia Fan, Gang Zeng, Houqiang Li, Yuhui Yuan, Lei Sun, and JingdongWang. Conditional detr for fast training convergence. In Proceedings of the IEEE/CVF International Conference on Computer Vision, pages 3651-3660, 2021

COCO dataset: Tsung-Yi Lin, Michael Maire, Serge Belongie, James Hays, Pietro Perona, Deva Ramanan, Piotr Doll'ar, and C Lawrence Zitnick. Microsoft coco: Common objects in context. In European conference on computer vision, pages 740-755. Springer, 2014

PyTorch: Adam Paszke, Sam Gross, Francisco Massa, Adam Lerer, James Bradbury, Gregory Chanan, Trevor Killeen, Zeming Lin, Natalia Gimelshein, Luca Antiga, et al. Pytorch: An imperative style, high-performance deep learning library. 2019.

AdamW: Ilya Loshchilov and Frank Hutter. Decoupled weight decay regularization. arXiv preprint arXiv: 1711.05101, 2017.

ACAR: Junting Pan, Siyu Chen, Mike Zheng Shou, Yu Liu, Jing Shao, and Hongsheng Li. Actor-context-actor relation network for spatio-temporal action localization. In Proceedings of the IEEE/CVF Conference on Computer Vision and Pattern Recognition, pages 464-474, 2021

WOO: Shoufa Chen, Peize Sun, Enze Xie, Chongjian Ge, Jiannan Wu, Lan Ma, Jiajun Shen, and Ping Luo. Watch only once: An end-to-end video action detection framework. In Proceedings of the IEEE/CVF International Conference on Computer Vision, pages 8178-8187, 2021

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

The invention claimed is:

1. A method of controlling an electronic apparatus for performing video action classification using a trained machine learning (ML) model, the method comprising:

receiving a plurality of frames of a video;

inputting, into the trained ML model, the plurality of frames;

extracting spatial features and temporal features from the plurality of frames by using a backbone network in the trained ML model;

identifying an actor in the plurality of frames, wherein the actor performs an action in the plurality of frames, wherein the identifying the actor within the plurality of frames comprises applying an actor transformer module in the trained ML model to the extracted spatial features and temporal features from key frames of the plurality of frames; and based on the actor being identified, classifying the action performed by the actor, wherein the applying the actor transformer module to the extracted spatial features and temporal features comprises inputting, into an encoder in the actor transformer module, the extracted spatial features and temporal features from the key frames.

2. The method as claimed in claim 1, wherein the identifying the actor within the plurality of frames comprises:

predicting a bounding box around the actor performing the action.

3. The method as claimed in claim 2, wherein the applying the actor transformer module to the extracted spatial features and temporal features comprises:

outputting, from the encoder in the actor transformer module, position features indicating potential positions of the actor in the key-frames;

inputting, into a decoder in the actor transformer module, the position features output from the encoder in the actor transformer module, and a set of actor queries; and outputting, from the decoder in the actor transformer module, final actor queries; and wherein the predicting the bounding box around the actor performing the action comprises:

inputting, into an actor classifier in the actor transformer module, the final actor queries; and outputting, from the actor classifier, coordinates of the bounding box for the actor and a classification score indicating a likelihood of the bounding box containing the actor.

4. The method as claimed in claim 3, wherein the classifying the action performed by the actor comprises:

applying an action transformer module in the trained ML model to the extracted spatial features and temporal features, and predicting a class for the actor performing the action.

5. The method as claimed in claim 4, wherein the applying the action transformer module to the extracted spatial features and temporal features comprises:

inputting, into an encoder in the action transformer module, the extracted spatial features and temporal features;

outputting, from the encoder in the action transformer module, action features indicating potential actions of the actor;

inputting, into a decoder in the action transformer module, the action features output from the encoder in the action transformer module, the final actor queries output by the decoder in the actor transformer module, and a set of action queries; and outputting, from the decoder in the action transformer module, final action queries; and wherein the predicting the class for the actor performing the action comprises:

inputting, into an action classifier in the action transformer module, the final action queries output from the decoder in the action transformer module; and outputting, from the action classifier, the class for the actor performing the action and a confidence value corresponding to the class.

6. The method as claimed in claim 5 further comprising:

matching the predicted bounding box with the predicted class for the actor; and obtaining a matching score indicating a likelihood of the predicted bounding box being associated with the predicted class.

7. The method as claimed in claim 6, wherein the matching comprises:

matching the predicted bounding box with the predicted class for the actor having the confidence value greater than a predetermined threshold value.

8. The method as claimed in claim 6, wherein the matching comprises:

matching the predicted bounding box with two or more predicted classes.

9. The method as claimed in any of claim 6 further comprising:

compressing, using the matching score, the plurality of frames of the video.

10. The method as claimed in claim 1, wherein the plurality of frames are a first set of frames in the video, and wherein the method further comprising:

classifying an action performed by the actor in a second set of frames in the video.

11. The method as claimed in claim 10, wherein the first set of frames is a subsequent set of the second set of frames.

12. The method as claimed in claim 1, wherein the video action classification is performed in real-time or near real-time.

13. The method as claimed in claim 1, wherein the identified actor is a human object or animal object.

14. An electronic apparatus for performing video action classification using a trained machine learning (ML) model, the electronic apparatus comprising:

a communication interface;

at least one processor configured to:

receive, through the communication interface, a plurality of frames of a video, input, into the trained ML model, the plurality of frames, extract spatial features and temporal features from the plurality of frames by using a backbone network in the trained ML model;

identify an actor in the plurality of frames, wherein the actor performs an action in the plurality of frames, wherein the at least one processor is configured to identify the actor within the plurality of frames comprises by applying an actor transformer module in the trained ML model to the extracted spatial features and temporal features from key frames of the plurality of frames, and based on the actor being identified, classify the action performed by the actor, wherein the at least one processor is configured to apply the actor transformer module to the extracted spatial features and temporal features by inputting, into an encoder in the actor transformer module, the extracted spatial features and temporal features from the key frames.

\* \* \* \* \*